United States Patent

Chikugo et al.

[11] Patent Number: 5,849,227
[45] Date of Patent: Dec. 15, 1998

[54] METHOD FOR FOAM MOLDING

[75] Inventors: Ryoji Chikugo; Akihiko Yoshii; Yuji Ashibe; Yasumasa Sato, all of Niihama, Japan

[73] Assignee: Sumitomo Heavy Industries, Ltd., Japan

[21] Appl. No.: 798,733

[22] Filed: Feb. 13, 1997

Related U.S. Application Data

[63] Continuation of Ser. No. 320,677, Oct. 11, 1994, abandoned.

[30] Foreign Application Priority Data

Oct. 14, 1993 [JP] Japan .................................. 5-256650

[51] Int. Cl.$^6$ .................................................. B29C 44/08
[52] U.S. Cl. .............................. 264/51; 264/55; 264/321
[58] Field of Search .................................. 264/45.2, 46.4, 264/46.5, 46.6, 275, 278, 321, 55, 51; 425/4 R

[56] References Cited

U.S. PATENT DOCUMENTS

| | | | |
|---|---|---|---|
| 3,392,423 | 7/1968 | Heider et al. | 425/4 R |
| 3,812,225 | 5/1974 | Hosoda et la. | 264/55 |
| 3,818,085 | 6/1974 | Marsland, Jr. et al. | 264/45.2 |
| 4,096,219 | 6/1978 | Mollenbruck et al. | 264/45.4 |
| 4,940,629 | 7/1990 | Weber et al. | 264/45.5 |
| 5,178,708 | 1/1993 | Hara et al. | 264/275 |

FOREIGN PATENT DOCUMENTS

| | | |
|---|---|---|
| 0313171 | 10/1988 | European Pat. Off. . |
| 60-222211 | 11/1985 | Japan . |
| 62-214938 | 9/1987 | Japan . |
| 63-315229 | 12/1988 | Japan . |
| 374172 | 11/1991 | Japan . |

Primary Examiner—Jan H. Silbaugh
Assistant Examiner—Kenneth M. Jones
Attorney, Agent, or Firm—Lorusso & Loud

[57] ABSTRACT

In foam molding for molding a foam-molded article from a foaming material, heat is applied while controlling the amount of foaming of the foaming material, control of the amount of foaming of the foaming material is halted, heating of the foaming material is removed and the foaming material is molded into a desired shape. The foaming material can be molded into a prescribed shape and at high speed even if the molded article is a complicated one.

3 Claims, 25 Drawing Sheets

REMOVAL OF PRESSURIZING FORCE

MOVEMENT OF HEATING PLATE

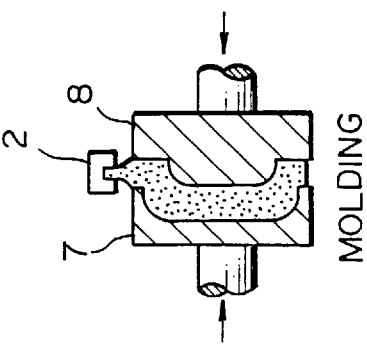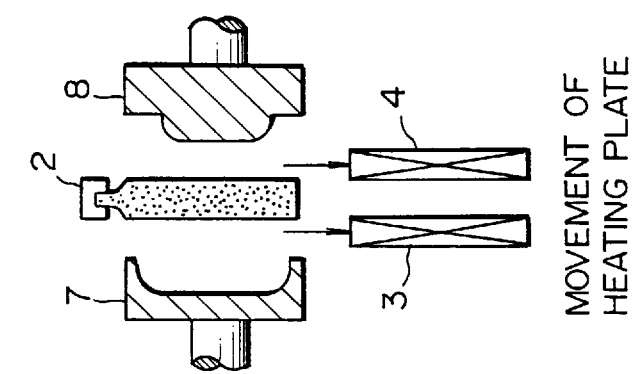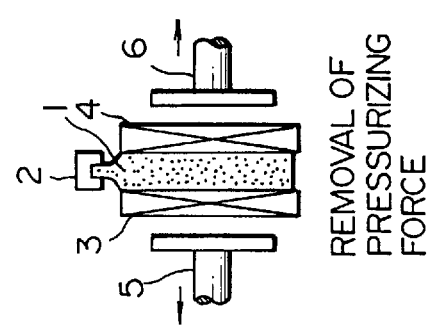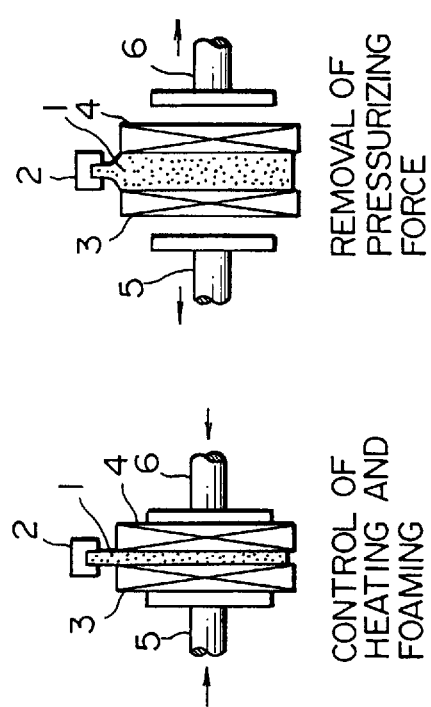
FIG.1(a) CONTROL OF HEATING AND FOAMING
FIG.1(b) REMOVAL OF PRESSURIZING FORCE
FIG.1(c) MOVEMENT OF HEATING PLATE
FIG.1(d) MOLDING

A~

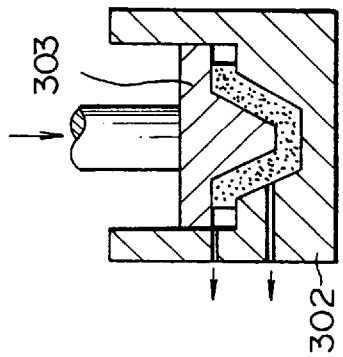
FIG.34(a) CONTROL OF HEATING AND FOAMING
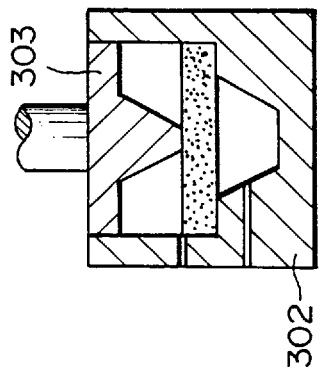
FIG.34(b) HALTING OF PRESSURIZATION
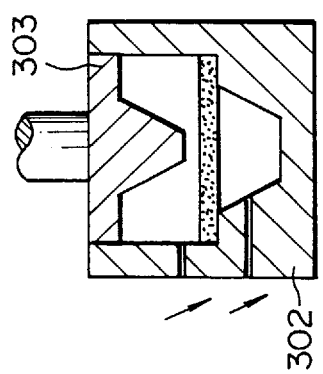
FIG.34(c) FREE FOAMING
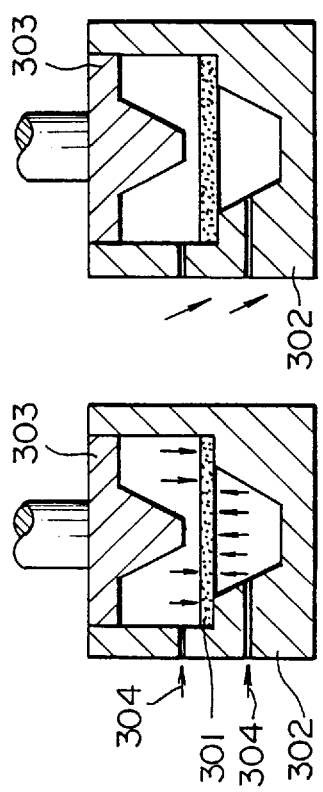
FIG.34(d) MOLDING

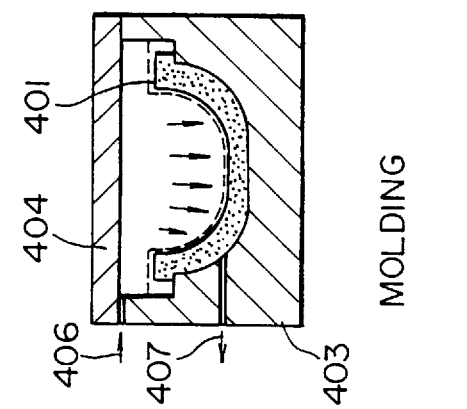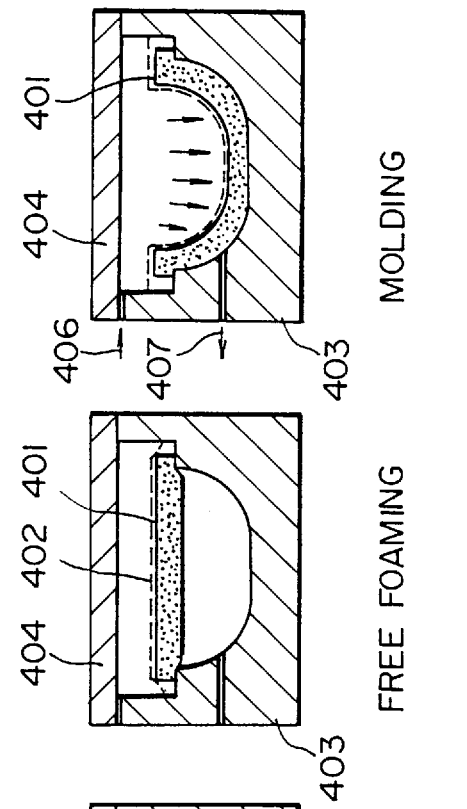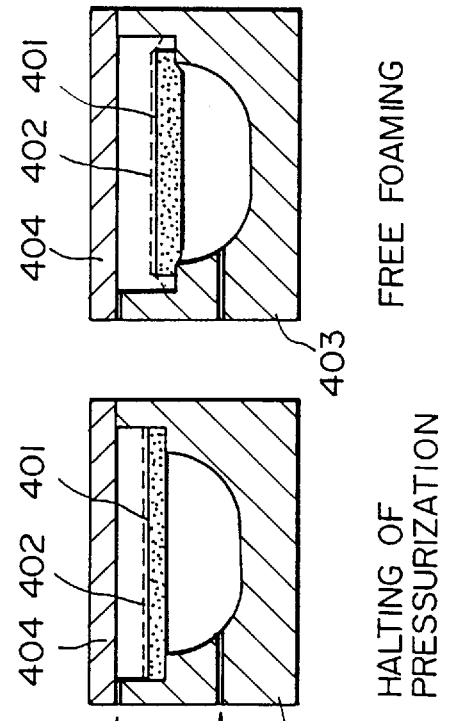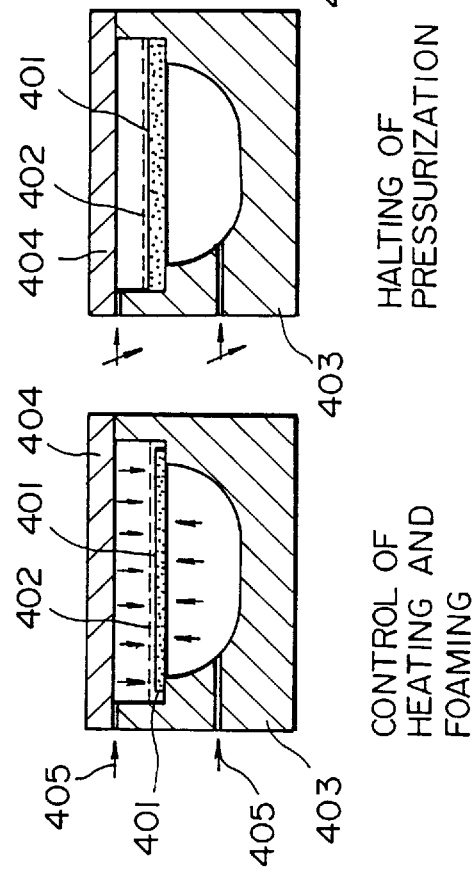

METHOD FOR FOAM MOLDING

This application is a continuation of application Ser. No. 08/320,677, filed Oct. 11, 1994, now abandoned.

BACKGROUND OF THE INVENTION

This invention relates to a foam molding method for molding a foamed material into a prescribed shape at high speed for mass production, and to a foam molding apparatus for practicing this method.

Examples of the prior art pertaining to this technical field are as follows:

(1) A method of molding a foamed structure is disclosed in the specification of Japanese Patent Application Laid-Open (KOKAI) No. 63-315229, by way of example.

According to this foam molding method, a foam structure which has already been foamed comprising a surface skin of a fiber-reinforced thermoplastic synthetic material and a thermoplastic foamed body is subjected to heating to impart the structure with a property which allows it to be deformed and worked, the heated sheet is provided with a desired structure and shape and the final product is then cooled to achieve molding.

With this foam molding method, however, a foam body which has already been foamed is molded by being reheated. A foam body already foamed is easily flawed by molding and therefore it is difficult to obtain a molded article having a foam body of high quality.

(2) A method of molding a foamed structure while foaming is in progress is disclosed in the specification of Japanese Patent Application Laid-Open (KOKAI) No. 62-214938, by way of example.

This foam molding method comprises steps of laminating a polypropylene foaming sheet, which contains a foaming agent, and a skin of sheet material, producing foaming by heating the laminate to a temperature greater than the foaming temperature of the foaming agent, and molding the laminated sheet, which has been foamed or is in the processing of being foamed, into a desired shape.

According to this foam molding method, however, sudden foaming generally is produced when the foaming sheet is heated to a temperature above the foaming temperature. As a result, the molding speed is not high enough to keep up with foaming and it is difficult to obtain a satisfactory foam body.

(3) A method of obtaining a molded body by freely foaming a foaming resin inside a mold is in wide use since this method provides a comparatively satisfactory core. Such a method is disclosed in the specifications of Japanese Patent Application Laid-Open (KOKAI) No. 60-222211 and Japanese Patent Publication (KOKOKU) No. 3-74172.

According to these foaming methods, however, there is a limitation upon shape. Moreover, since heating and molding are carried out inside the same mold, heating and cooling of the mold take time. For this reason, these methods are not suited to high-speed molding.

Thus, as set forth above, the conventional foam molding methods involve various problems and it is difficult to mold a foaming material into a prescribed shape and to perform molding at high speed for mass production.

SUMMARY OF THE INVENTION

An object of the present invention is to provide a foam molding method and apparatus through which a foaming material is heated while being subjected to foaming control, the material is foamed while amount of expansion (foaming) of the foaming material is suppressed, after which the foaming material is molded rapidly, whereby the material can be molded into a prescribed shape with high quality and at high speed even if the molded article is a complicated one.

According to the present invention, the foregoing object is attained by providing the following apparatus (A) and method (B):

(A) A foam molding method for molding a foam-molded article from a foaming material is characterized by executing the following steps in succession: a step of applying heat while controlling amount of foaming of the foaming material, a step of halting control of amount of foaming of the foaming material, a step of removing application of heat from the foaming material, and a step of molding the foaming material into a desired shape.

Control of the amount of foaming of the foaming material is performed by controlling the pressure of heating elements brought into contact with the foaming material.

(B) A foam molding apparatus for molding a foam-molded article from a foaming material comprises means for applying heat while controlling amount of foaming of the foaming material, means for halting control of amount of foaming of the foaming material, means for removing application of heat from the foaming material, and means for molding the foaming material into a desired shape.

The means for applying heat while controlling amount of foaming of the foaming material has heating elements brought into contact with the foaming material from both sides thereof and is provided with a device for controlling the amount of displacement of the heating elements.

Alternatively, a device is provided for controlling pressure applied to the heating elements.

Furthermore, the means for removing application of heat from the foaming material comprises a device for rapidly moving the heating elements away from the foaming material.

Further, the means for applying heat while controlling amount of foaming of the foaming material is a high-temperature gas filling the interior of a sealed mold heating the foaming material from both sides thereof.

Furthermore, a leakage device is provided for allowing leakage of gas pressure of the high-temperature gas.

The general features of the present invention are as follows by virtue of the construction described above:

(1) A foaming material is held by a clamp and set between heating plates serving as a pair of heating elements. Pressure is applied to the heating plates by pressurizing elements and the pressurizing force is controlled in stages. Control of heating and foaming is performed while controlling the amount of foaming of the foaming material.

Next, the pressurizing elements are withdrawn from both sides to remove the pressurizing force applied to the foaming material, and control of foaming is halted. The heating plates are then moved from the foaming material instantaneously. For example, a device (mechanism) for dropping the heating plates or forcibly moving the heating plates away is provided. Further, the heating plates may be withdrawn from the foaming material by being moved horizontally.

Thus, the heating of the foaming material is removed instantaneously and the foaming material is allowed to undergo free foaming. When the heating plates are moved away, molds are set to oppose the foaming material. Next, the foaming material is subjected to press molding rapidly by the molds during free foaming.

(2) First, the foaming material is held by a clamp and set between the heating plates serving as a pair of heating elements provided one above the other. The foaming material is embraced by the heating plates to which pressure is applied by pressurizing elements secured to the heating plates, and the pressurizing force is controlled in stages. Control of heating and foaming is performed while controlling the amount of foaming of the foaming material. Next, the pressurizing force applied to the pressurizing elements is removed and control of foaming is halted. The foaming material is then moved toward a mold instantaneously.

Thus, the heating of the foaming material is removed instantaneously and the foaming material is allowed to undergo free foaming. Next, the foaming material is subjected to press molding rapidly by the mold during free foaming.

(3) The foaming material is set in a mold and the foaming material is heated by gas at high temperature and pressure. After foaming is controlled by changing the gas pressure, gas pressure is allowed to leak and press molding is carried out. At this time the mold is evacuated simultaneously, whereby vacuum molding is performed concurrently.

(4) The foaming material and a diaphragm membrane are set in a mold and the foaming material is heated and pressurized by a high-temperature gas. Foaming is controlled by varying the gas pressure. Gas in the space above the foaming material is allowed to leak to produce a vacuum, and gas pressure in the space above the foaming material is elevated, thereby performing diaphragm molding.

Since controlled foaming is carried out in the manner described above, foaming proceeds satisfactorily and a high-quality core is obtained.

Further, by performing controlled foaming and lowering the foaming force, free foaming in the ensuing process no longer becomes sudden foaming. The mechanical moving process is performed with ease and flawing of a foam body during free foaming can be prevented.

Furthermore, in the process for moving the heating device, it is so arranged that the foaming material and the heating device (heating plates or high-temperature fluid) are capable of being separated from each in order to conduct molding. As a result, constraint on the foaming of the foaming material is removed so that the material may start foaming freely. However, free foaming is not sudden and the foam body is maintained in excellent condition.

Further, in the pressurized molding process, a temperature at which molding is possible is established by heating. In addition, in a case where a foaming material having foaming pressure is molded (by press molding, vacuum molding, etc.), the molding of complicated shapes can be carried out with ease since the material possesses molding pressure (internal pressure).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1(a)~(d) are diagrams showing a foam molding process according to a first embodiment of the present invention;

FIGS. 34(a)–(d) are diagrams showing a foam molding process according to a third embodiment of the present invention; and FIGS. 35(a)–(d) are diagrams showing a foam molding process according to a fourth embodiment of the present invention.

DESCRIPTION OF THE PREFERRED EMBODIMENTS

Embodiments of the present invention will now be described in detail with reference to the accompanying drawings.

A first embodiment of the present invention will now be described with reference to FIGS. 1(a) through 24.

The foaming material used in this embodiment is a thermoplastic foaming resin (sheet) (which can include leather, woven fabric, glass or carbon fibers, etc.) containing a foaming agent, and/or a composite or laminate comprising this foaming resin and a surface material (protective sheet).

A method of foam molding illustrating a first embodiment of the present invention will now be described with reference to FIGS. 1(a) through 4.

Figure 2:
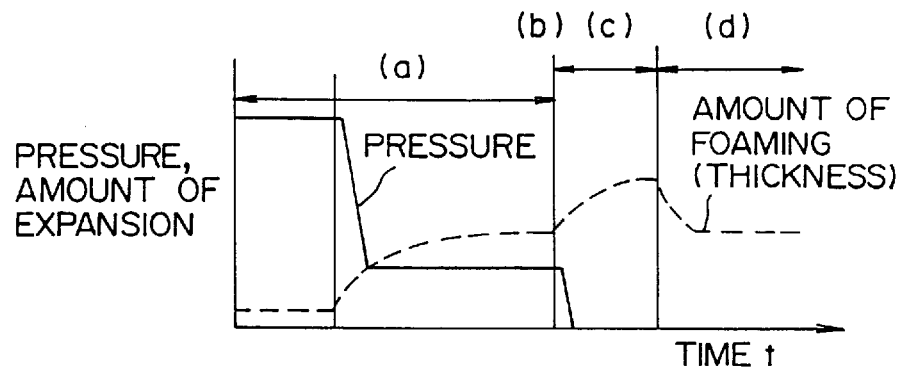
FIG. 2 is a diagram showing the relationship between pressure, which is applied to a foaming material, and amount of foaming according to the first embodiment of the present invention.

First, as shown in FIG. 1(a), a foaming material 1 is held by a clamp 2 and set between heating plates 3, 4 serving as a pair of heating elements. Pressure is applied to the heating plates 3, 4 from both sides by pressurizing elements 5, 6 and the pressurizing force is controlled in stages, as illustrated in FIG. 2. Control of heating and foaming is carried out while controlling the amount of foaming of the foaming material 1. In FIG. 2, pressure or amount of expansion is plotted along the vertical axis and time (t) is plotted along the horizontal axis. Further, (a), (b), (c) and (d) in FIG. 2 indicate the steps at (a), (b), (c) and (d) in FIG. 1, respectively.

Next, as depicted at (b) in FIG. 1, the pressurizing elements 5, 6 are withdrawn from both sides to remove the pressurizing force applied to the foaming material 1, and control of foaming is halted.

The heating plates 3, 4 are then moved from the foaming material 1 instantaneously, as shown at (c) in FIG. 1. For example, a device (mechanism), which is not shown, is provided for dropping the heating plates 3, 4 or for forcibly moving the heating plates 3, 4. Further, the heating plates may be withdrawn from the foaming material by being moved horizontally, as shown in FIGS. 20–24.

Thus, the heating of the foaming material 1 is removed instantaneously and the foaming material 1 is allowed to undergo free foaming. When the heating plates 3, 4 are moved, molds 7, 8 are set to oppose the foaming material 1. Next, the foaming material is subjected to press molding rapidly by the mold during free foaming.

Next, as shown at (d) in FIG. 1, the foaming material 1 is subjected to press molding rapidly by the molds 7, 8 while free foaming is in progress.

Controlling the pressure of the foaming material 1 can be executed in two ways.

Figure 3:
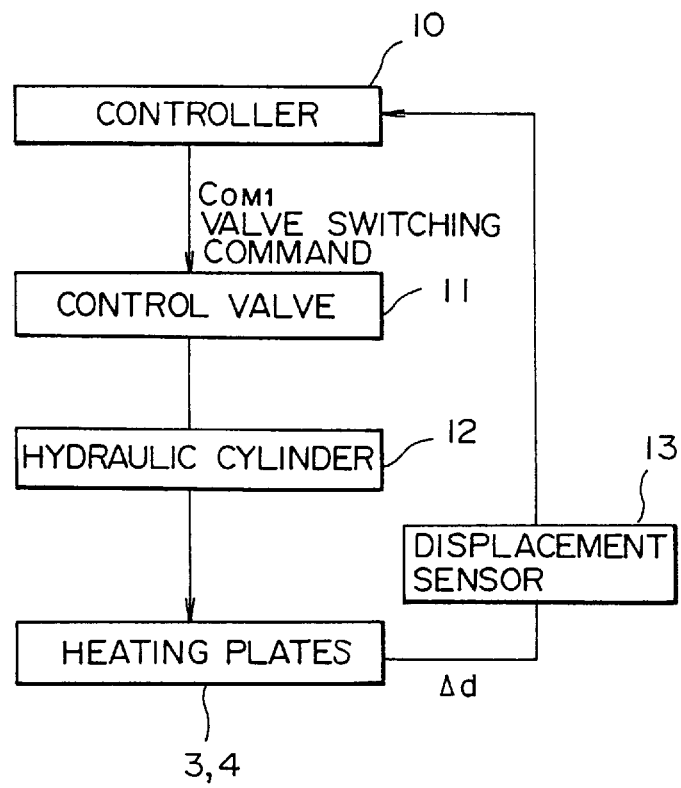
FIG. 3 is a block diagram illustrating an apparatus for controlling amount of displacement of heating plates brought into contact with a foaming material according to the first embodiment of the present invention.

The first is to provide a controller 10, a control valve 11, a hydraulic cylinder 12, the heating plates 3, 4 and a displacement sensor 13, as shown in FIG. 3, sense the amount $\Delta d$ of displacement of the heating plates 3, 4 by the displacement sensor 13, and have the controller 10 read the output signal of the displacement sensor 13 and control the positions of the heating plates 3, 4.

Figure 4:
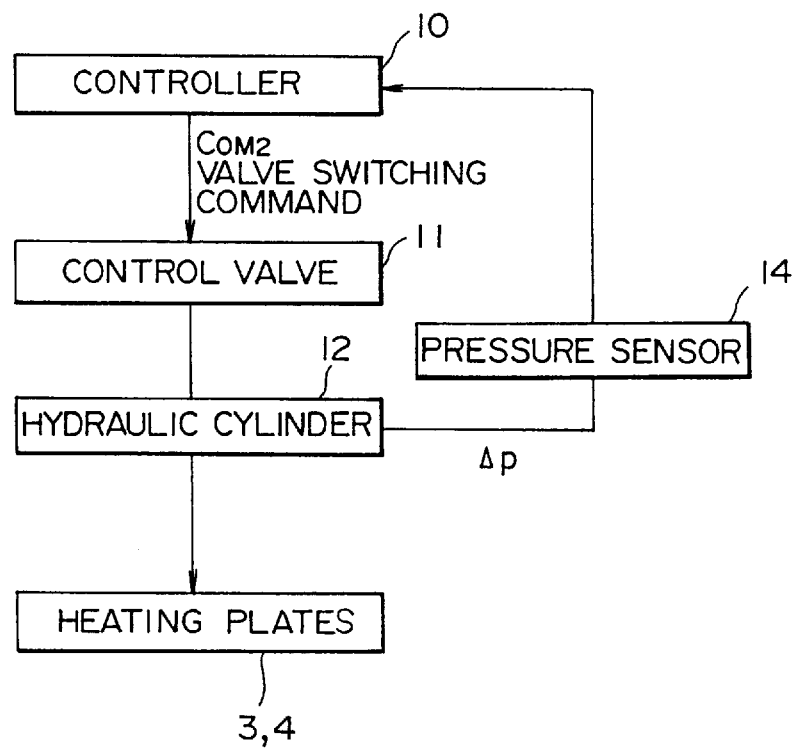
FIG. 4 is a block diagram illustrating an apparatus for controlling pressure applied to heating plates brought into contact with a foaming material according to the first embodiment of the present invention.

The second is to provide the controller 10, the control valve 11, the hydraulic cylinder 12, the heating plates 3, 4 and a pressure sensor 14, as shown in FIG. 4, sense the amount $\Delta p$ of a change in hydraulic pressure, which the hydraulic cylinder 12 applies to the heating plates 3, 4, by the pressure sensor 14, and have the controller 10 read the output signal of the pressure sensor 14 and control the pressurizing force of the heating plates 3, 4.

By virtue of this arrangement, heating and foaming are controlled, after which the foaming material can be molded during free foaming. As a result, the foam material can be molded into a prescribed shape with high quality and at high speed even if the molded article is a complicated one.

Next, a foam molding apparatus illustrating the first embodiment of the present invention will be described with reference to FIGS. 5 through 17.

As shown in FIGS. 5 through 17, the apparatus includes fixed members which are a base 21, two vertical frames 22, 23 and a horizontal frame 24 extending from the frame 23.

Numeral 15 denotes a foaming material. An apparatus (mechanism) for holding the foaming material has frames 25 provided on the upper portion of the vertical frame 22, first arms 26, second arms 27, a clamp 28, a clamp rotary actuator 33 for driving the clamp 28, a sprocket 34, a chain 38, a sprocket 35, a shaft 30, a sprocket 36, a chain 39 and a sprocket 37.

Furthermore, a heating device includes a pair of heating plates 43, 44, heating-plate holders 45, 46, guide pins 47 between the heating-plate holders 45, 46, and springs 48 provided between the heating plates 43, 44 for releasing them. It should be noted that the springs 48 for releasing the heating plates 43, 44 and the guide pins 47 are formed at the corners so as not to hinder the insertion of the foaming material 15.

An apparatus (mechanism) for raising and lowering the heating device includes chains 52 for raising and lowering the heating plates, sprocket supporting members 53, 54, sprockets 55, 56, a chain fixing plate 57 and a chain fixing plate 58 on one side of the heating plate holder. This apparatus is also provided with an air cylinder 51 for raising and lowering the heating plates.

Furthermore, a heating-plate guide apparatus (mechanism) includes a guide 61 supported on guide ribs 62, a stopper air cylinder 63, a stopper 64 and a shock absorber 65 provided on the bottom of the guide 61.

A heating-plate pressurizing apparatus (mechanism) includes hydraulic cylinders 66 for applying pressure to the heating plates, heating-plate pressure plates 67, 68, and displacement sensors 69 for sensing amount of displacement of the heating-plate pressure plates 67, 68.

Furthermore, a molding apparatus (mechanism) includes molding hydraulic cylinders 71 as well as a female mold 72 and a male mold 73 driven by the hydraulic cylinders 71.

The various apparatus (mechanisms) set forth above will be described in greater detail below.

(1) With regard to the fixed portions, the two vertical frames 22, 23 are erected on the base 21, as shown in FIGS. 5 through 8. The horizontal frame 24 extends outwardly from the upper portion of the frame 23 on the left side. The hydraulic cylinders 66 for applying pressure to the heating plates and the molding hydraulic cylinders 71 are supported on the inner side of each of the frames 22, 23.

(2) With regard to the apparatus for holding the foaming material, the first arms 26 are provided on the frames 25, which are in turn provided on the upper portion of the vertical frame 22, as shown in FIGS. 5, 6 and FIGS. 9~15. The second arms 27 are pivoted on the distal ends of the respective first arms 26 by the shaft 30. The clamp 28 is provided on the distal ends of the second arms 27. That is, the ends of the second arms are provided with a central axis 29.

Fixed rods 32 for fixed claws are provided on both sides in coaxial relation with the central axis 29. Fixed claws 28a are secured to the fixed rods 32. Similarly, rotating rods 31 for movable claws are placed at the center between the fixed rods 32 for the fixed claws so as to be embraced by the fixed rods 32 via bushes 40 in coaxial relation with the central axis 29. Movable claws 28b are secured to the respective rotating rods 31 for these movable claws. The sprocket 37 is fixed centrally between the rotating rods 31 for the movable claws.

By driving the rotary actuator 33 for the clamp, power is transmitted to the rotating rods 31 for the movable claws via the sprocket 34, chain 38, sprocket 35, shaft 30, sprocket 36, chain 39 and sprocket 37, thereby making it possible to turn the movable claws 28b and operate the clamp 28 in cooperation with the fixed claws 28a. In other words, the foaming material 15 can be held by clamp 28. Numeral 42 denotes a stopper pin which limits the turning angle of the second arms 27.

(3) With regard to the heating device, the pair of heating plates 43, 44 is provided, as shown in FIGS. 5, 6, 8 and FIGS. 16, 17, and the heating plates 43, 44 are raised in temperature by internal heaters. Adjustment of temperature is performed by making use of a temperature controller provided as ancillary equipment.

Figure 17:
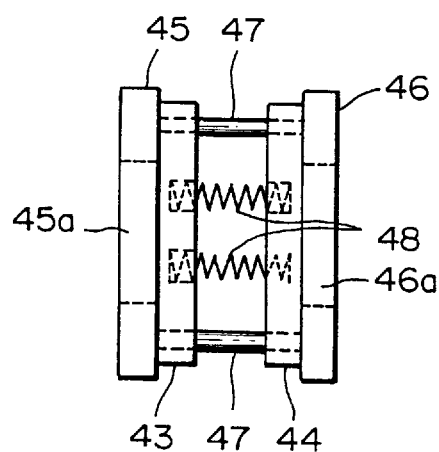
FIG. 17 is a side view of a heating device according to the first embodiment of the present invention.

As illustrated in FIG. 17, the two heating plates 43, 44 are united by the guide pins 47 and heating-plate holders 45, 46. Uniting the heating plates 43, 44 in this manner is convenient in terms of moving the heating plates 43, 44. The springs 48 for releasing the heating plates 43, 44 are internally provided between the heating plates. The arrangement is such that the heating plates 43, 44 are capable of being released from the foaming material 15 rapidly by the springs 48 while being guided by the guide pins 47. It should be noted that the chain fixing plate 58 (described below) on one side of the heating-plate holder is secured above the heating-plate holders 45, 46.

Figure 5:
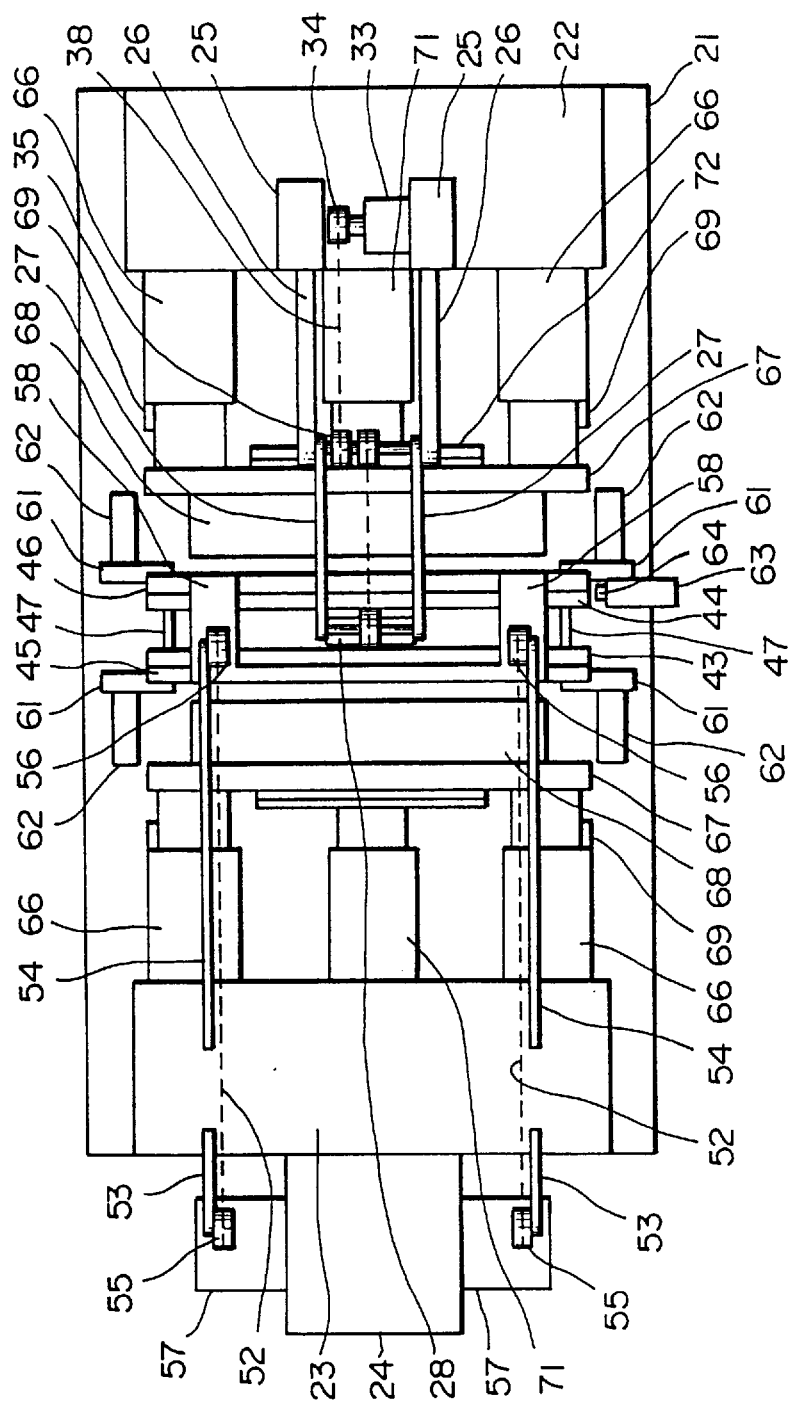
FIG. 5 is a plan view showing a foam molding apparatus (mechanism) according to the first embodiment of the present invention.
Figure 6:
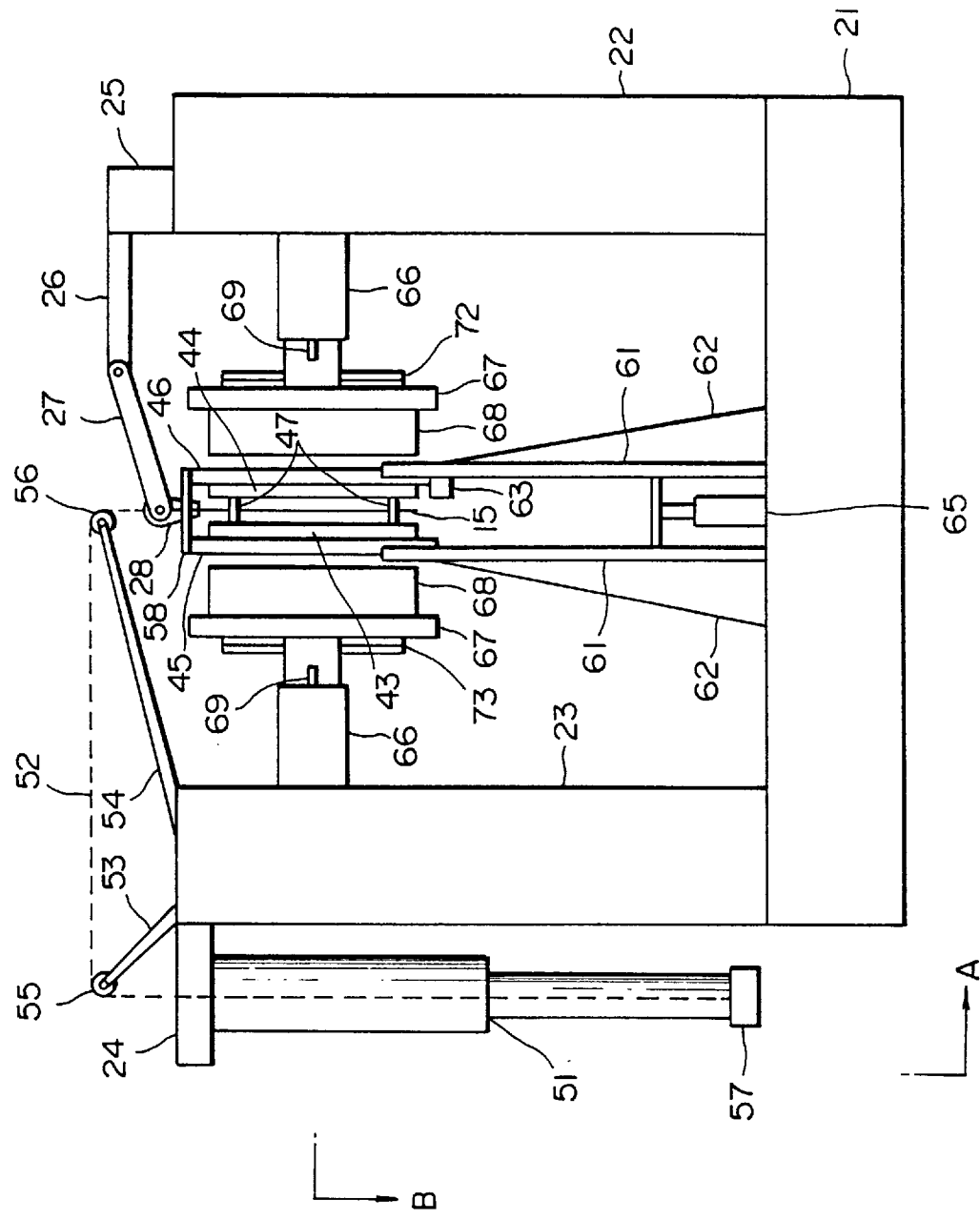
FIG. 6 is a front view showing a foam molding apparatus (mechanism) according to the first embodiment of the present invention.
Figure 7:
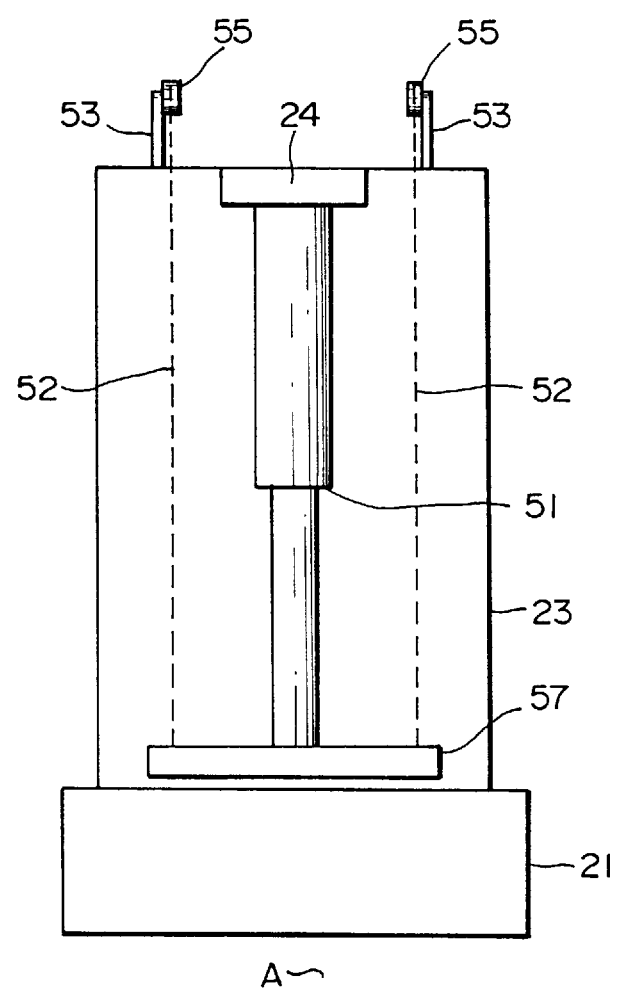
FIG. 7 is a view (side view) as seen along line A—A of FIG. 6.

(4) With regard to the apparatus for raising and lowering the heating device, as shown in FIGS. 5 through 7, the chains 52 for raising and lowering the heating plates are stretched between the sprockets 55, 56 provided at the ends of the sprocket supporting members 53, 54. One end of each chain is fixed to the chain fixing plate 57, and the other end of each chain is fixed to the chain fixing plate 58 on one side of the heating plate holder.

In a case where the heating device is situated at the heating position of the foaming material 15, the lower end of the heating device is moved upward from the stopper 64 by driving (extending) the air cylinder 51 for raising and lowering the heating plates, and the chains 52 for raising and lowering the heating plates, which chains are provided on the side of the air cylinder 51 for raising and lowering the heating plates, are raised by driving (retracting) the air cylinder 51. The heating device is stopped by the stopper 64 driven by the stopper air cylinder 63, described later, so as to be situated at a position corresponding to the foaming material 15, and heats the foaming material 15 while the foaming thereof is controlled.

At this time the air cylinder 51 for raising and lowering the heating plates is retracted to place the chains 52 for raising and lowering the heating plates in the free state. When heating of the foaming material is concluded, the heating device is separated from the foaming material 15, the stopper 64 is released by driving the stopper air cylinder 63, the chain fixing plate 58 on the side of the heating-plate holder is lowered and the heating device descends to the shock absorber 65, described later.

Thus, the heating plates 43, 44 are linked to the air cylinder 51 for raising and lowering the heating plates via the chains 52 and are capable of being moved up and down. Further, the heating plates 43, 44 are held by the stopper 64. By releasing the stopper 64 by driving the stopper air cylinder 63, the heating plates 43, 44 are allowed to fall abruptly under their own weight. At this time the heating plates 43, 44 fall along the guide 61, described later, and the shock of the falling heating plates 43, 44 is absorbed by the shock absorber 65 disposed below the heating plates 43, 44.

Instead of dropping the heating plates as is done in this embodiment, an arrangement may be adopted in which the heating plates are moved horizontally to be successively withdrawn, as will be described later (see FIGS. 20~24).

Figure 8:
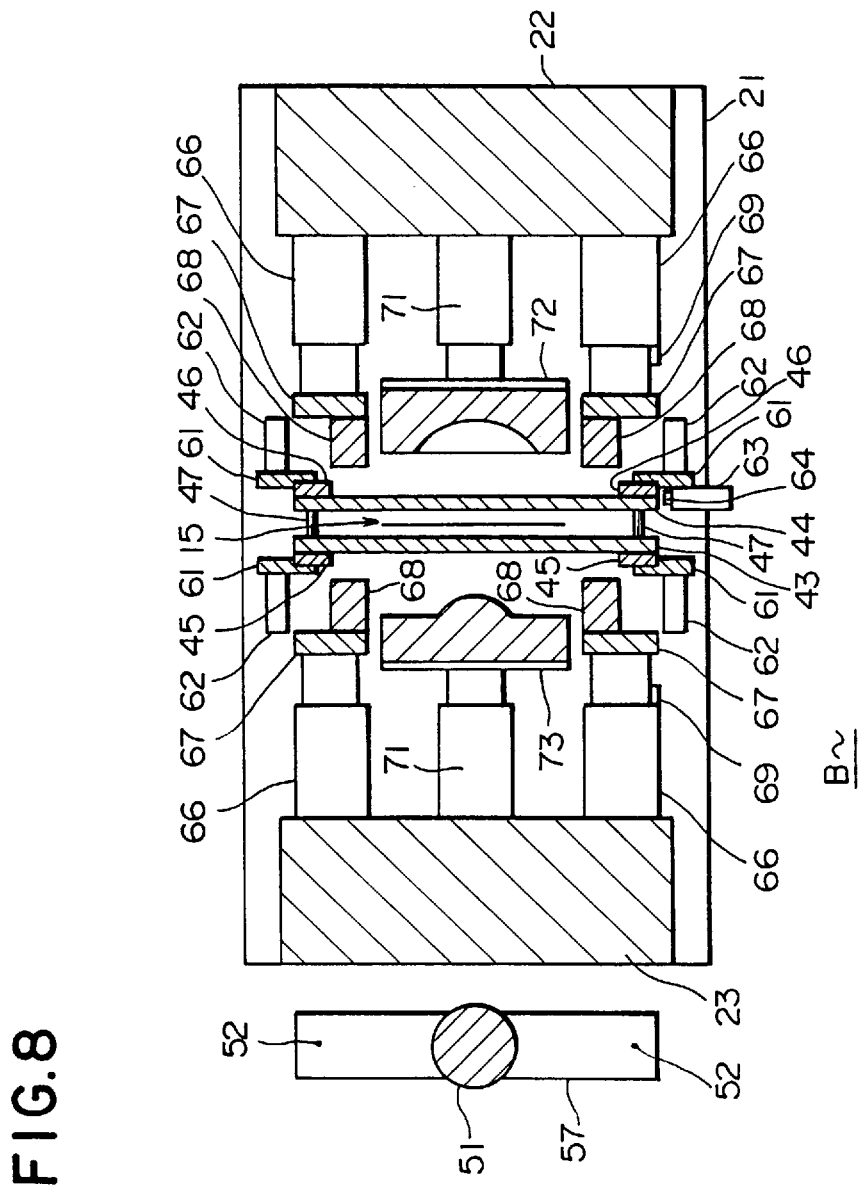
FIG. 8 is a view (sectional view) as seen along line B—B of FIG. 6.
Figure 9:
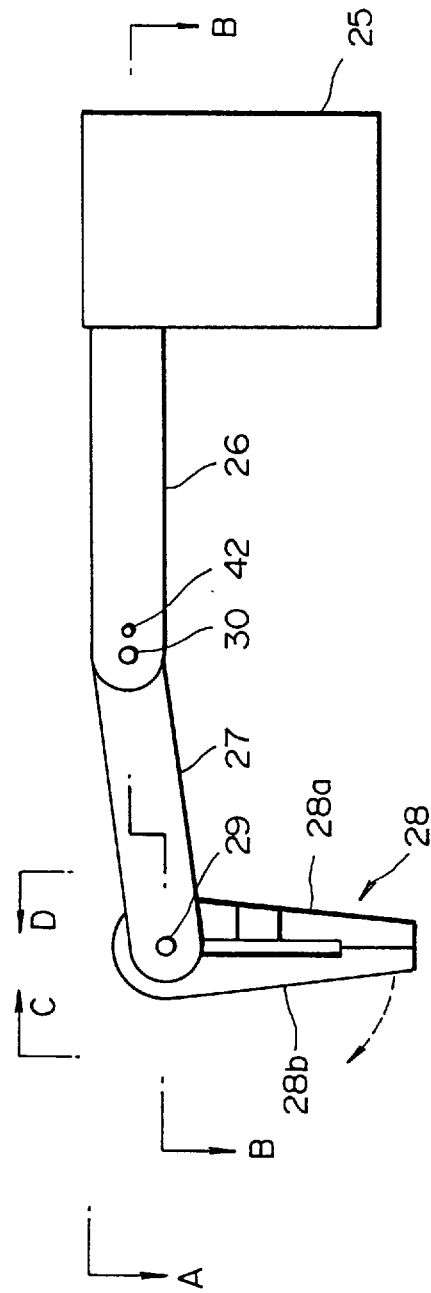
FIG. 9 is a front view showing a foaming-material holding apparatus (mechanism) according to the first embodiment of the present invention.
Figure 10:
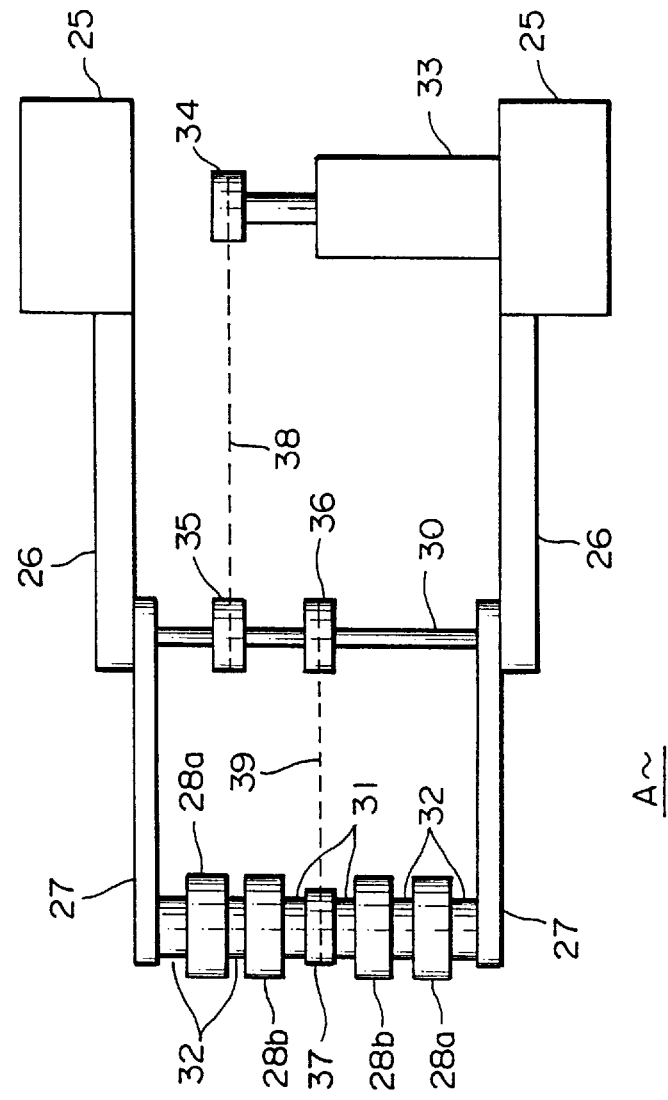
FIG. 10 is a top view (a view as seen along line A—A in FIG. 9) showing a foaming-material holding apparatus (mechanism) according to the first embodiment of the present invention.
Figure 11:
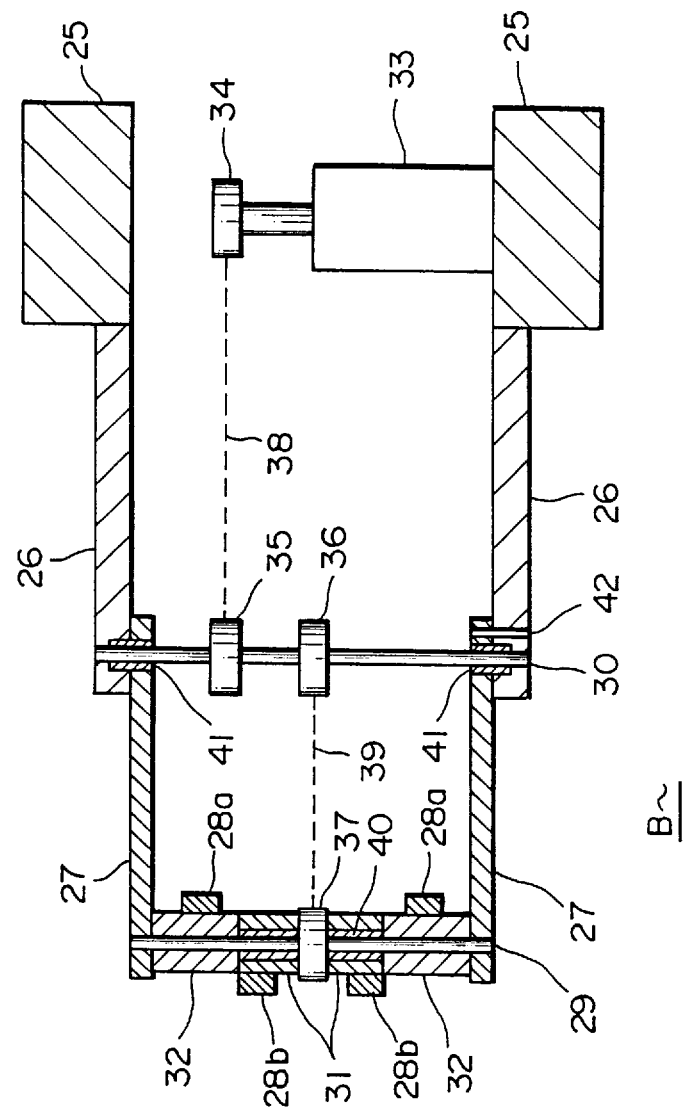
FIG. 11 is a view as seen along line B—B of FIG. 9.
Figure 12:
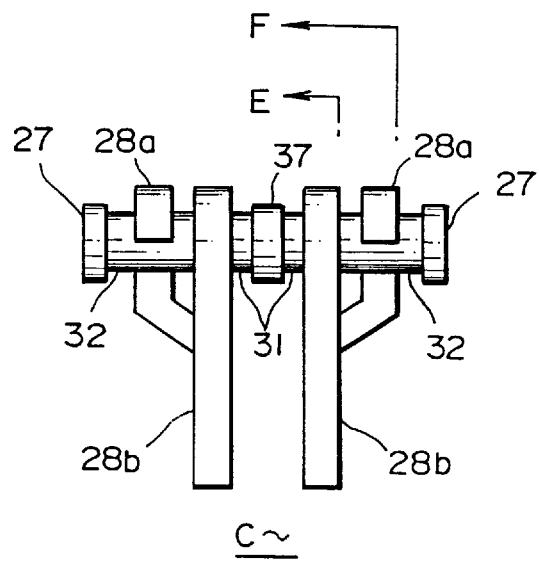
FIG. 12 is a view as seen along line C—C of FIG. 9.
Figure 13:
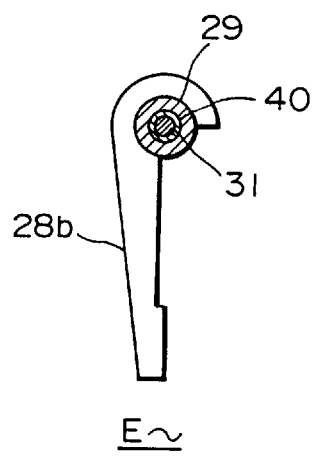
FIG. 13 is a view as seen along line E—E of FIG. 12.
Figure 14:
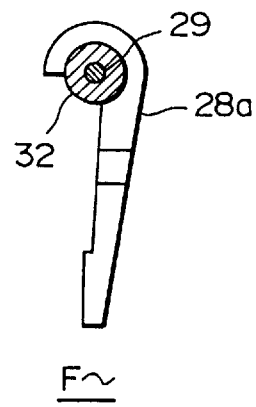
FIG. 14 is a view as seen along line F—F of FIG. 12.
Figure 15:
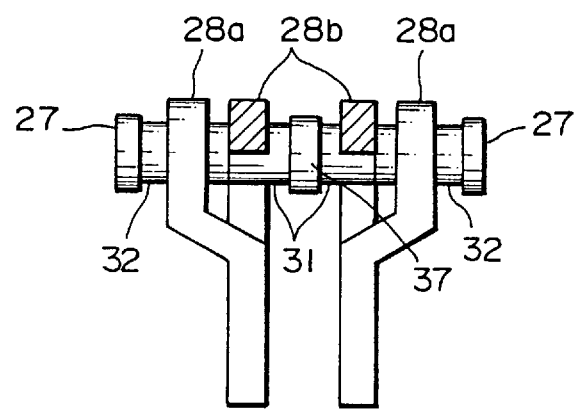
FIG. 15 is a view as seen along line D—D of FIG. 9.
Figure 16:
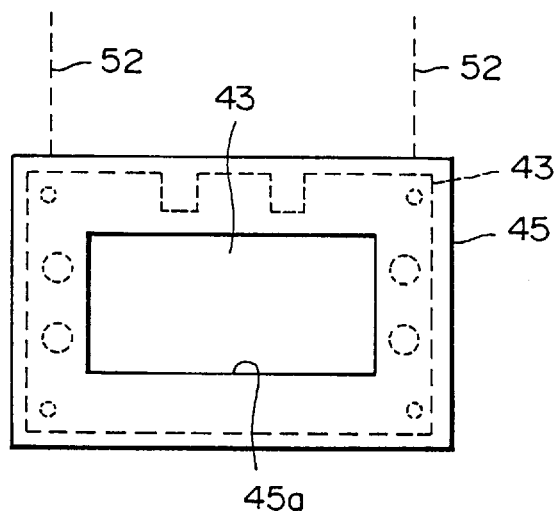
FIG. 16 is a front view of a heating device according to the first embodiment of the present invention.

(5) With regard to the heating-plate guide apparatus, as shown in FIGS. 5, 6, 8, 16 and 17, the apparatus has the guide 61, which is supported on the guide ribs 62, and the stopper 64 driven by the stopper air cylinder 63. The shock absorber 65 is provided on the bottom of the guide 61, (6) With regard to the heating-plate pressurizing apparatus, as shown in FIGS. 5, 6 and 8, the heating plates 43, 44 are pressurized in a form in which a space for the molding molds is hollowed out in order that pressurizing of the heating plates and press molding may be performed at the same location. The heating-plate holders 45, 46 are hollowed out at the central portions thereof to form holes 45a, 46a that enable the heating plates to be pressurized. More specifically, the heating plates 43, 44 are pressed by the heating-plate pressure plates 67, 68, respectively, through the respective holes 45a, 46a.

The two hydraulic cylinders 66 for applying pressure to the heating plates are provided on both ends of the heating-plate pressure plates 67, 68, and the heating plates 43, 44 are pressurized by driving the hydraulic cylinders 66. Here the amount of displacement of the hydraulic cylinders 67, 68 is sensed by the displacement sensors 69.

(7) With regard to the molding apparatus, as shown in FIGS. 5, 6 and 8, the female mold 72 and the male 5 mold 73 are actuated by driving the molding hydraulic cylinders 71 when the heating device is moved downwardly. Thus, the foaming material 15 can be press molded by the molds 72, 73.

Thus, the foaming material 15 is held by the above-described foaming-material holding apparatus and the heating plates 43, 44 are pressurized by the heating-plate pressurizing apparatus. The heating plates 43, 44 are moved after they are heated, after which press molding is carried out by the molding apparatus.

Figure 18:
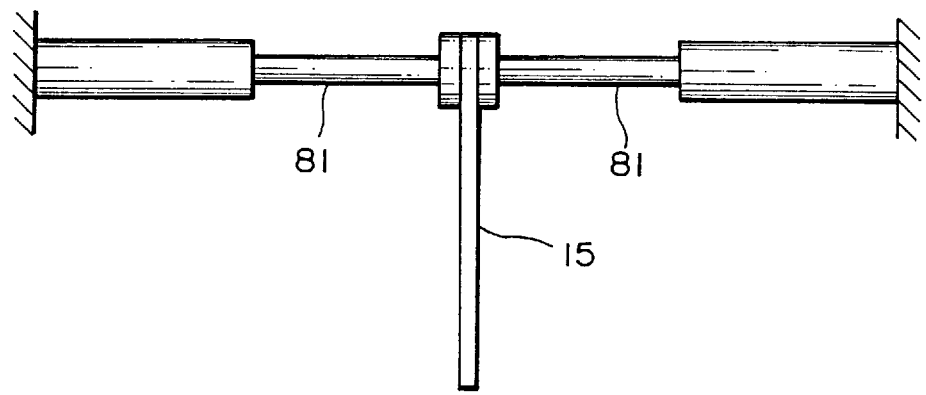
FIG. 18 is a diagram showing the construction of a heating-plate holding apparatus (mechanism) illustrative of a modification of the first embodiment of the present invention.

Instead of using the foaming-material holding apparatus described above, it is possible to use an apparatus (mechanism) which holds the foaming material 15 by utilizing air cylinders (or hydraulic cylinders) 81, as shown in FIG. 18, a method in which an opening is formed in the foaming material 15 and engaged by a hook, or a method in which use is made of a spring-type clamp (means such as a clothespin).

Figure 19:
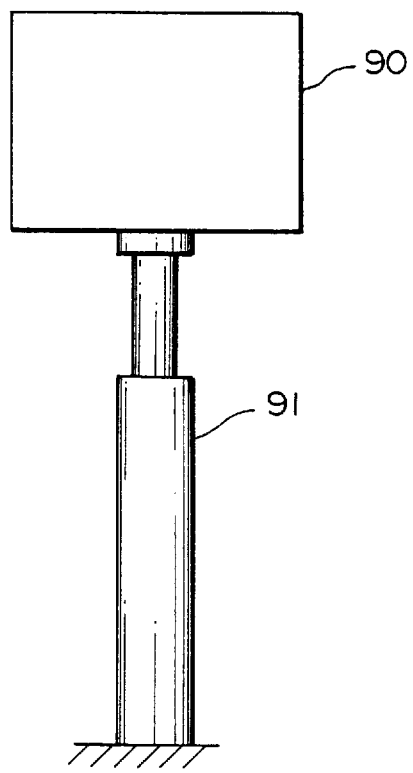
FIG. 19 is a diagram showing the construction of a heating-plate holding and raising/lowering apparatus (mechanism) illustrative of a further modification of the first embodiment of the present invention.

Further, instead of using the apparatus for raising and lowering the heating device, an arrangement of the kind shown in FIG. 19 may be adopted, in which a heating device 90 comprising heating plates or heating-plate holders is directly coupled to a cylinder 91 and the heating device 90 is moved by raising the lowering the cylinder 91.

A foam molding apparatus illustrating another first embodiment of the present invention will now be described with reference to FIGS. 20–24.

According to this embodiment, the heating plates are withdrawn horizontally in succession utilizing a servomotor and chains, as illustrated in FIGS. 20–24.

As shown in FIGS. 20–24, a base 101 and two vertical frames 102, 103 are provided as the fixed portions. The central part of the base 101 is broadened in width in order to provide a location at which the heating plates can be withdrawn.

Further, an apparatus (mechanism) is provided for holding a foaming material 104. More specifically, clamps 106 are supported on a clamp supporting rod 105.

Furthermore, a heating device includes a pair of heating plates 107, 108, heating-plate holders 109, 110, and guide pins 111 between the heating-plate holders 109, 110.

An apparatus (mechanism) for withdrawing the heating device includes a servomotor 121 for moving the heating plates, sprockets 122, 123, 125, 128, 131, 132, chains 126, 127, 129 for moving the heating plates, and sprocket holders 124, 130.

Furthermore, to construct a heating-plate guide apparatus (mechanism), a guide 141 which guides the heating plates is provided. The guide 141 extends in the horizontal direction and is capable of retracting the heating plates.

Further, a heating-plate pressurizing apparatus (mechanism) includes hydraulic cylinders 151 for applying pressure to the heating plates, and heating-plate pressure plates 152, 153.

A molding apparatus (mechanism) includes molding hydraulic cylinders 161 as well as a female mold 162 and a male mold 163 driven by the hydraulic cylinders 161.

The various apparatus (mechanisms) set forth above will be described in greater detail below.

(1) With regard to the fixed portions (mechanisms), the two vertical frames 102, 103 are erected on both sides of the base 101, as shown in FIGS. 20 through 24. The hydraulic cylinders 151 for applying pressure to the heating plates and the molding hydraulic cylinders 161 are supported on each of the frames 102, 103.

Figure 20:
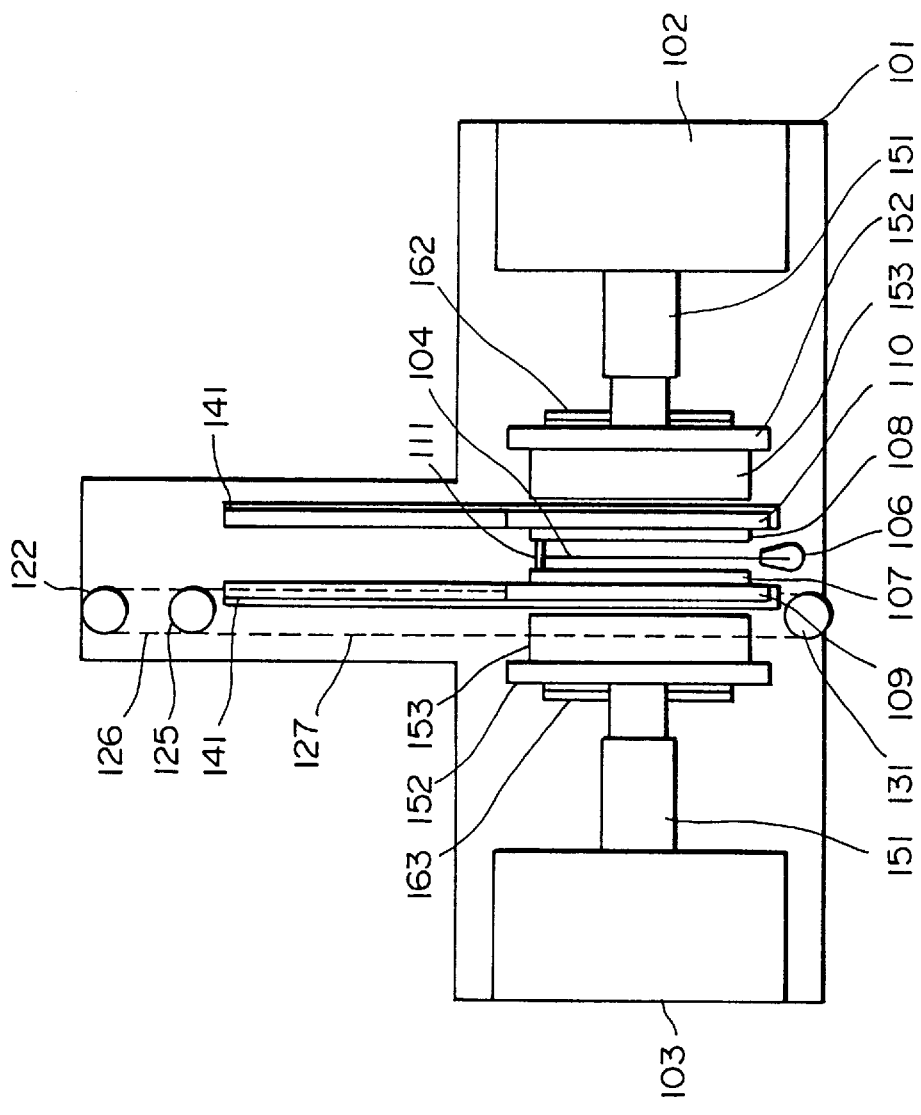
FIG. 20 is a top view of a foam molding apparatus (mechanism) according to another first embodiment of the present invention.
Figure 21:
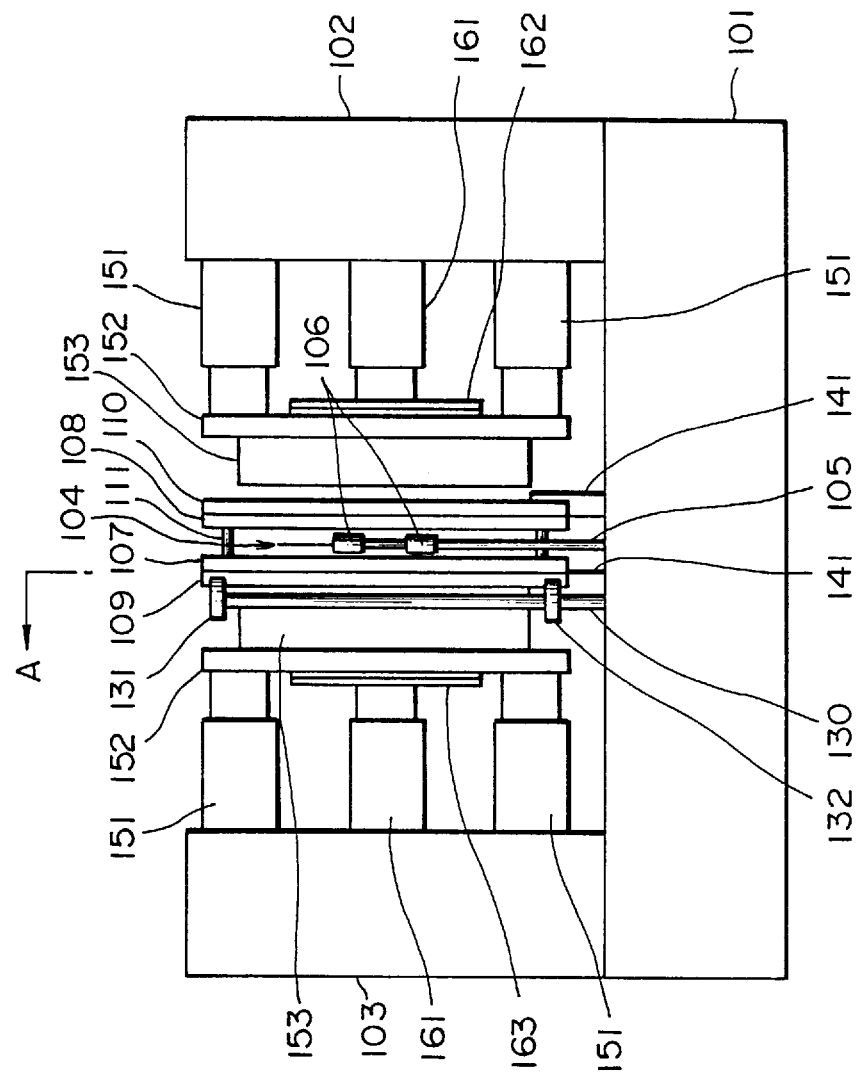
FIG. 21 is a front view of a foam molding apparatus (mechanism) according to the other first embodiment of the present invention.

(2) With regard to the apparatus for holding the foaming material, the vertical clamp supporting rod 105 is provided, as shown in FIGS. 20, 21, and the clamps 106 are provided on the clamp supporting rod 105 to hold the foaming material 104.

(3) With regard to the heating device, the pair of heating plates 107, 108 is provided, as shown in FIGS. 20, 21, and the heating plates 107, 108 are raised in temperature by internal heaters. The two heating plates 107, 108 are united by the guide pins 111 and heating-plate holders 109, 110. The chains 127, 129, described later, for moving the heating plates are connected to the heating-plate holder 109 of the heating device, as illustrated in FIG. 20.

Figure 22:
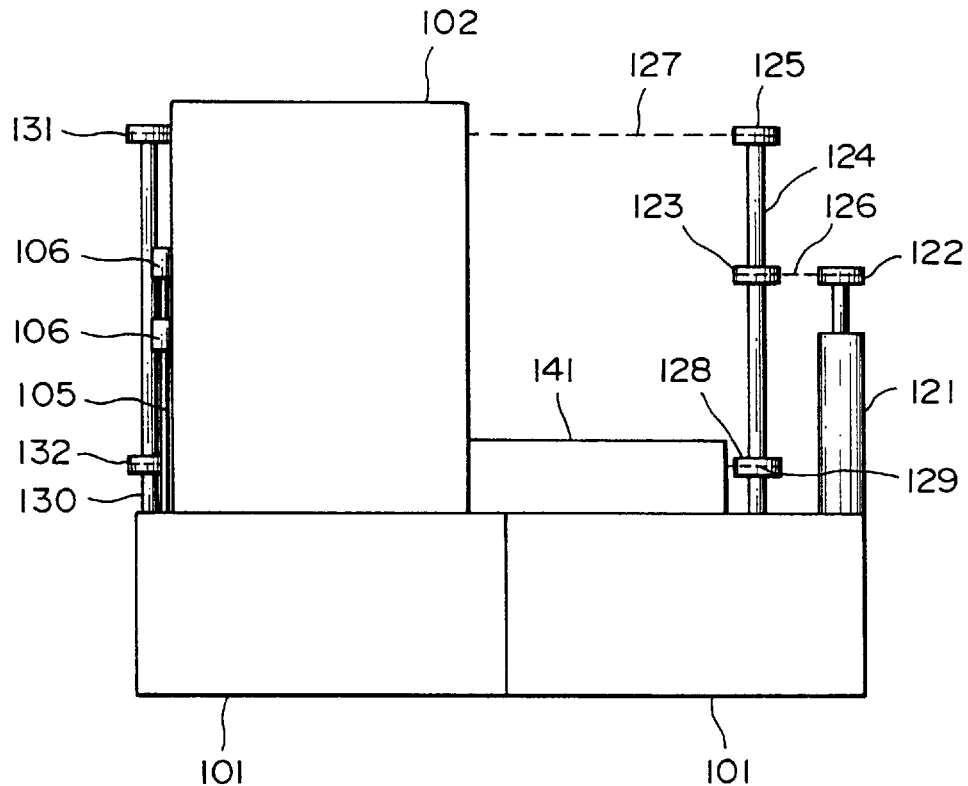
FIG. 22 is a side view of a foam molding apparatus (mechanism) according to the other first embodiment of the present invention.
Figure 23:
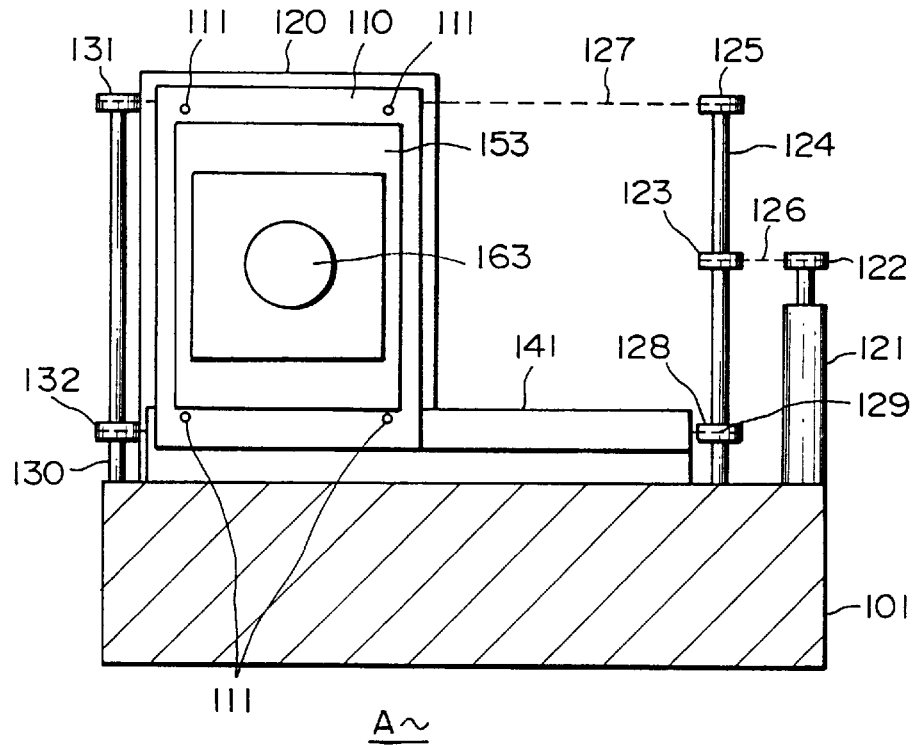
FIG. 23 is a view as seen along line A—A of FIG. 21.
Figure 24:
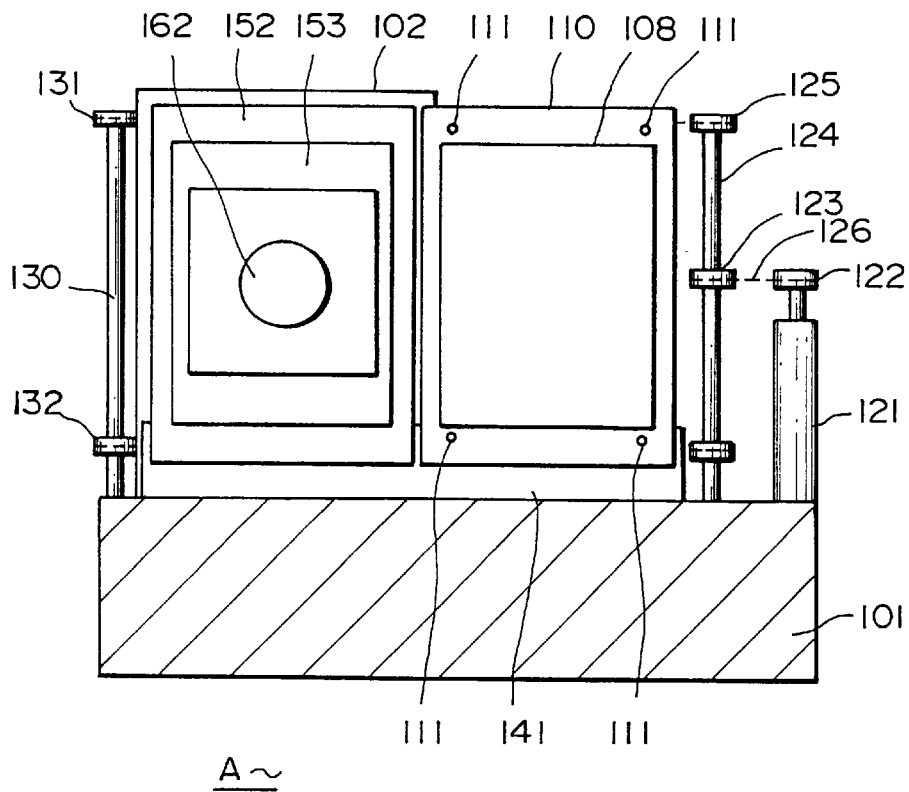
FIG. 24 is a side view showing withdrawal of heating plates of the foam molding apparatus (mechanism) according to the other first embodiment of the present invention.

(4) With regard to the apparatus for withdrawing the heating device, as shown in FIG. 20 and FIGS. 22, 23, the heating plates 107, 108 oppose the foaming material 104. However, in a case where the heating plates 107, 108 are withdrawn, as shown in FIG. 24, the sprocket 122, the chain 126 for moving the heating plates, the sprocket 123, the sprocket holder 124, the sprocket 125, the chain 127 for moving the heating plates, the upper portion of the heating-plate holder 109, the chain 127 for moving the heating plates, the sprocket 131, the chain 127 for moving the heating plates and the sprocket 125 are driven by driving the servomotor 121 for moving the heating plates. Concurrently, the sprocket 122, the chain 126 for moving the heating plates, the sprocket 123, the sprocket holder 124, the sprocket 128, the chain 129 for moving the heating plates, the lower portion of the heating-plate holder 109, the chain 129 for moving the heating plates, the sprocket 132, the chain 129 for moving the heating plates and the sprocket 128 are driven by driving the servomotor 121 for moving the heating plates. As a result, the foaming material 104 is withdrawn in the horizontal direction along the guide 141.

(5) With regard to the heating-plate pressurizing apparatus, as in the above-described embodiment, the heating plates 107, 108 are pressurized in a form in which a space for the molding molds is hollowed out in order that pressurizing of the heating plates and press molding may be performed at the same location. The heating-plate holders 109, 110 are hollowed out at the central portions thereof to enable the heating plates to be pressurized. More specifically, the heating plates 107, 108 are pressed by the heating-plate pressure plates 152, 153, respectively, through the hollowed-out portions. The two hydraulic cylinders 151 for applying pressure to the heating plates are provided on both ends of the heating-plate pressure plates 152, 153, and the heating plates 107, 108 are pressurized by driving the hydraulic cylinders 151.

(6) With regard to the molding apparatus, as in the foregoing embodiment, the female mold 162 and the male mold 163 are actuated by driving the molding hydraulic cylinders 161 when the heating device is moved in the horizontal direction. Thus, the foaming material 104 can be press molded by the molds 162, 163.

Thus, the foaming material 104 is held by the above-described foaming-material holding apparatus and the heating plates 107, 108 are pressurized by the heating-plate pressurizing apparatus. The heating plates 107, 108 are moved and retracted in the horizontal direction after they are heated, after which press molding is carried out by the molding apparatus. Though not illustrated, a buckling suppresser is provided besides the male and female molds and the molds are either operatively associated via a spring or moved independently by providing separate cylinders.

A foam molding method illustrating a second embodiment of the present invention will be described with reference to FIGS. 25(*a*) through 28.

The foam molding method according to the second embodiment of the invention will now be described.

Figure 25:
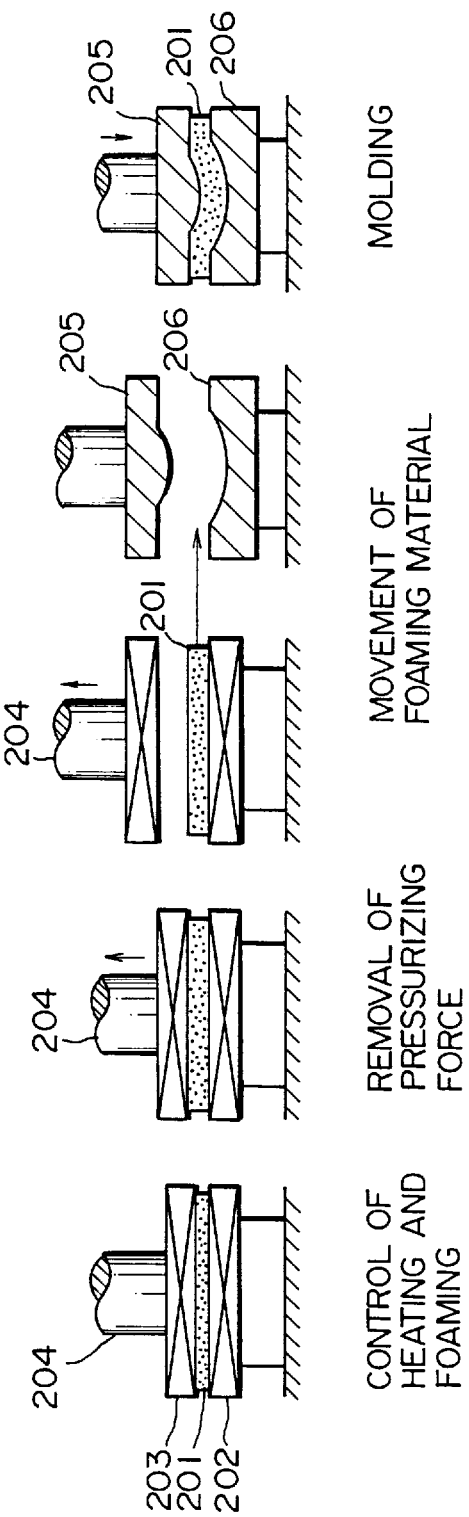
FIGS. 25(a)~(d) are diagrams showing a foam molding process according to a second embodiment of the present invention.
Figure 26:
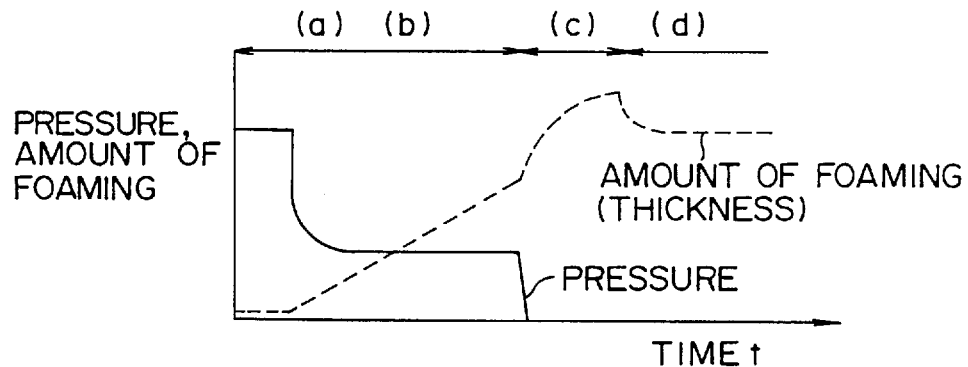
FIG. 26 is a diagram showing the relationship between pressure, which is applied to a foaming material, and amount of foaming according to the second embodiment of the present invention.

First, as shown in FIG. 25(*a*), a foaming material 201 is held and set by a clamp (not shown), and heating plates 202, 203 are provided one above the other to serve as a pair of heating elements. With the foaming material 201 embraced by the heating plate 202, 203, pressure is applied to the heating plate 203 by a pressurizing element 204 secured to the heating plate 203, and the pressurizing force is controlled in stages, as illustrated in FIG. 26. Control of heating and foaming is carried out while controlling the amount of foaming of the foaming material 201.

Next, as depicted at (b) in FIG. 25, pressure applied to the pressurizing element 204 is removed and control of foaming is halted.

The foaming material 201 is then moved into the molds 205, 206 instantaneously, as shown at (c) in FIG. 25. Thus, heating of the foaming material 201 is removed instantaneously and the foaming material 201 is allowed to undergo free foaming.

Next, as shown at (d) in FIG. 25, the foaming material 201 is subjected to press molding rapidly by the molds 205, 206 while free foaming is in progress.

Controlling the pressure of the foaming material 201 can be executed in two ways.

Figure 27:
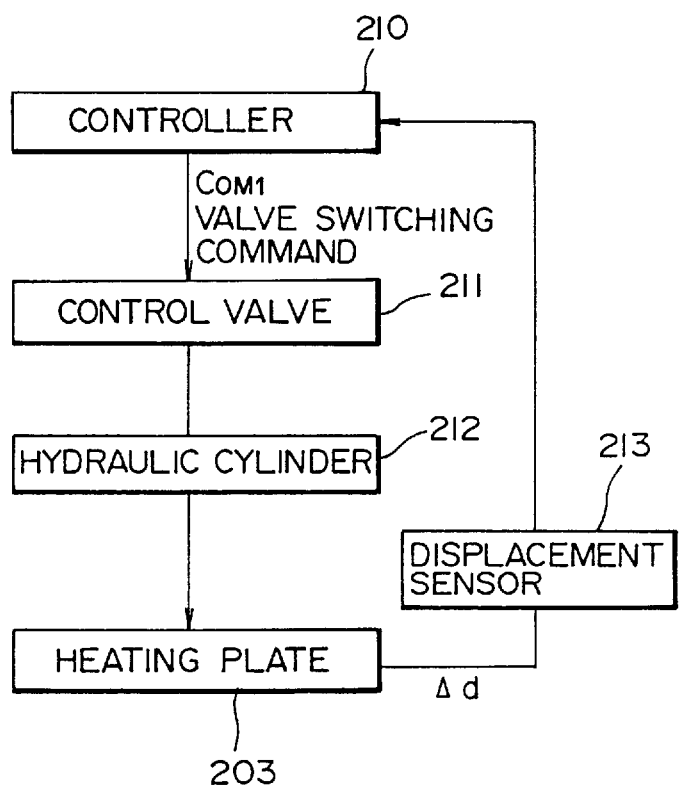
FIG. 27 is a block diagram illustrating an apparatus for controlling amount of displacement of a heating plate brought into contact with a foaming material according to the second embodiment of the present invention.

The first is to provide a controller 210, a control valve 211, a hydraulic cylinder 212, the heating plate 203 and a displacement sensor 213, as shown in FIG. 27, sense the amount Δd of displacement of the heating plate 203 by the displacement sensor 213, and have the controller 210 read the output signal of the displacement sensor 213 and control the positions of the heating plate 203.

Figure 28:
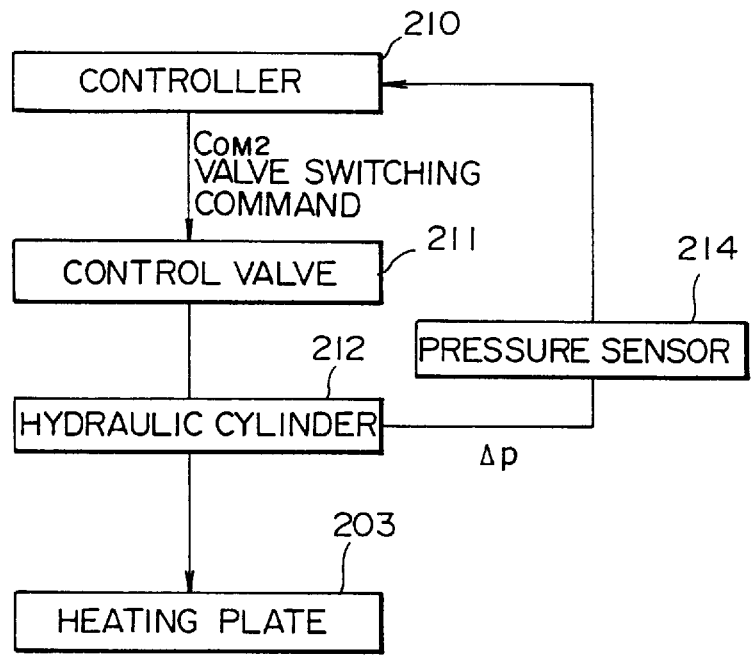
FIG. 28 is a block diagram illustrating an apparatus for controlling pressure applied to a heating plate brought into contact with a foaming material according to the second embodiment of the present invention.
Figure 29:
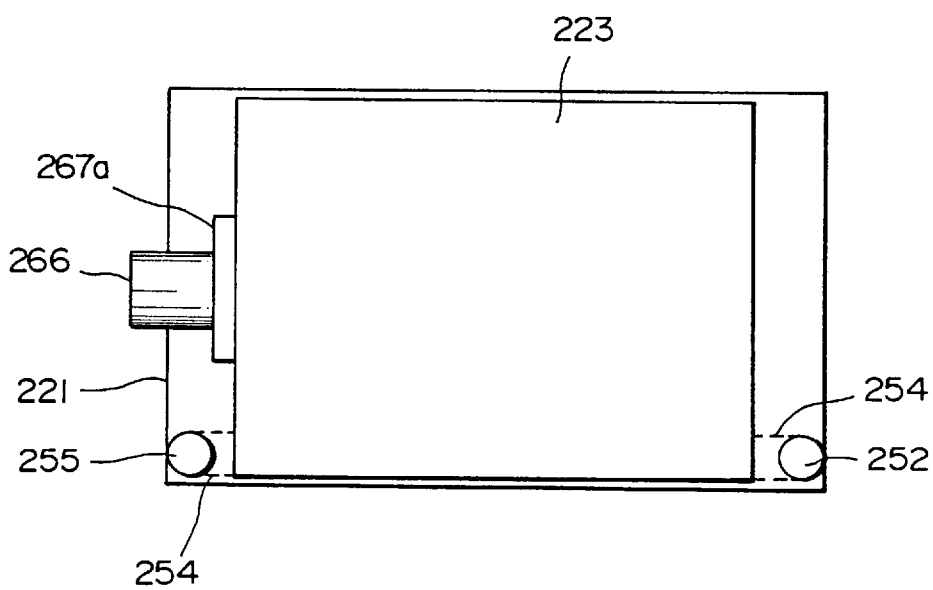
FIG. 29 is a plan view showing a foam molding apparatus (mechanism) according to the second embodiment of the present invention.
Figure 30:
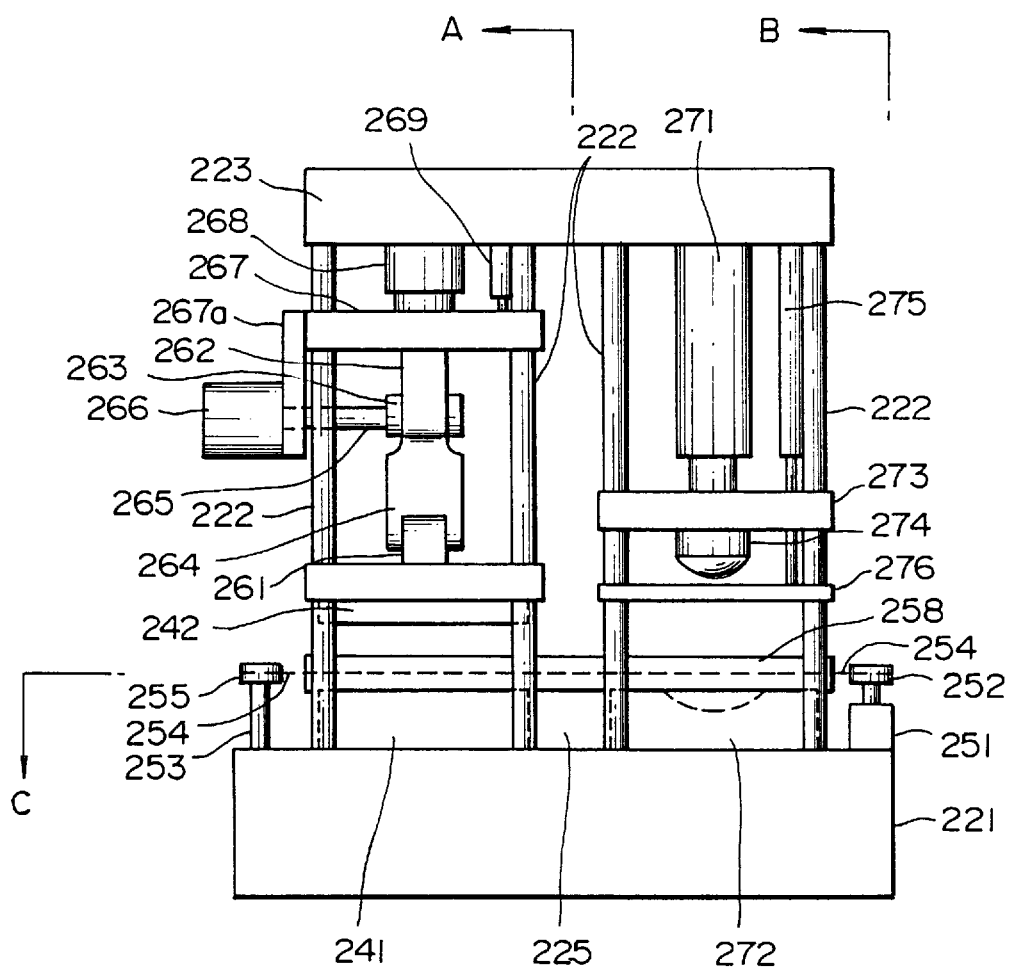
FIG. 30 is a front view showing a foam molding apparatus (mechanism) according to the second embodiment of the present invention.
Figure 31:
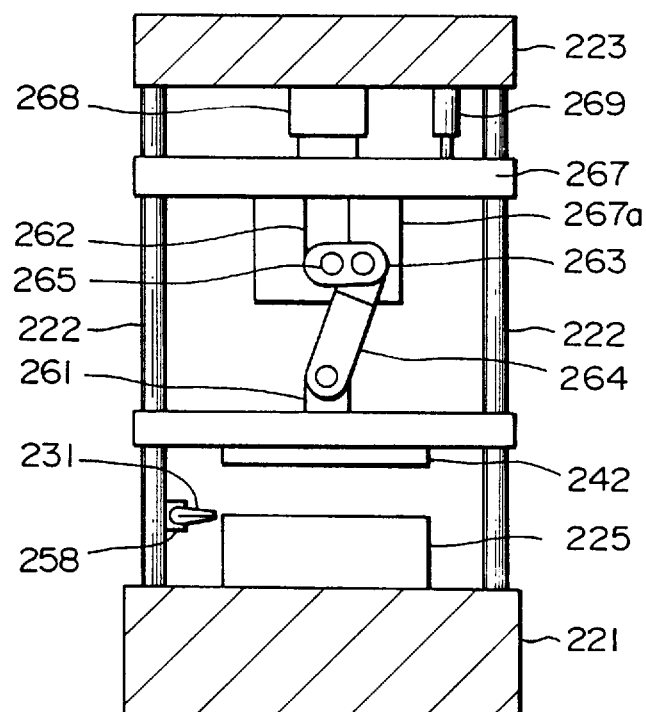
FIG. 31 is a view (side view) as seen along line A—A of FIG. 30.
Figure 32:
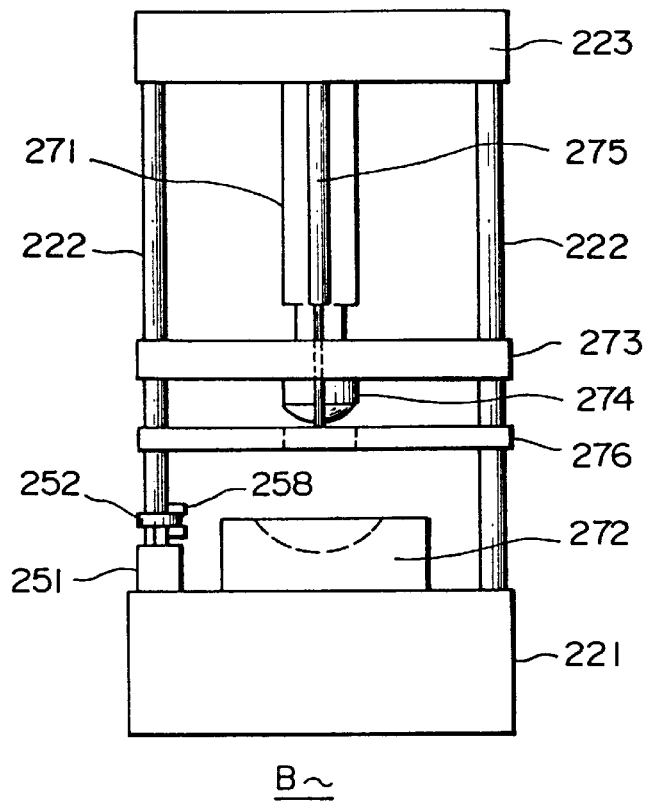
FIG. 32 is a view as seen along line B—B of FIG. 30.
Figure 33:
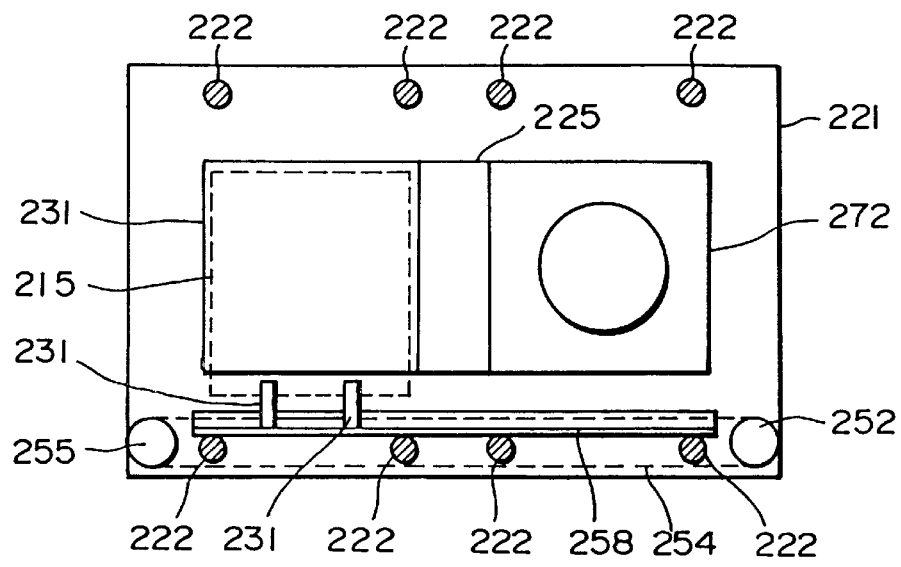
FIG. 33 is a view as seen along line C—C of FIG. 30.

The second is to provide the controller 210, the control valve 211, the hydraulic cylinder 212, the heating plate 203 and a pressure sensor 214, as shown in FIG. 28, sense the amount Δp of a change in hydraulic pressure, which the hydraulic cylinder 212 applies to the heating plate 203, by the pressure sensor 214, and have the controller 210 read the output signal of the pressure sensor 214 and control the pressurizing force of the heating plate 203.

By virtue of this arrangement, heating and foaming are controlled, after which the foaming material can be molded during free foaming. As a result, the foam material can be molded into a prescribed shape with high quality and at high speed even if the molded article is a complicated one.

Next, a foam molding apparatus illustrating the second embodiment of the present invention will be described with reference to FIGS. 29 through 33.

As shown in FIGS. 29 through 33, the apparatus includes fixed members which are a base 221, eight vertical tie rods 222 erected on the base 221, a frame 223 provided on the upper portion of the ties rods, and an intermediate base 225.

The apparatus (mechanism) for holding the foaming material is provided with a clamp 231 in order to hold the foaming material 215. The clamp 231 is fixed to a chain 254, described below, for heating-plate conveyance.

Furthermore, the heating device includes a pair of heating plates 241, 242.

An apparatus (mechanism) for conveying the foaming material includes a heating-plate conveying servomotor 251, sprockets 252, 255, the heating-plate conveying chain 254 and a sprocket holder 253. The clamp 231 is mounted on the heating-plate conveying chain 254. The foaming material 215 is shifted from a foaming control section to a molding section in the free-foaming state.

Furthermore, the clamp 231 holding the foaming material 215 is moved along a guide 258.

A heating-plate pressurizing and raising/lowering apparatus (mechanism) includes rods 261, 262, cam shafts 263, 264 for rapid opening and closing, a shaft 265, a servomotor 266 for rapid opening and closing, a connecting plate 267a, a movable plate 267, a heating-plate pressurizing hydraulic cylinder 268 and a displacement sensor 269.

A molding apparatus (mechanism) includes a molding hydraulic cylinder 271, a female mold 272 driven by this cylinder, and a male mold 274 provided on a male-mold base 273. A buckling suppresser 276 for the foaming material 215 and an air cylinder 275 for suppressing buckling also are provided.

Thus, the foam molding apparatus comprises the foaming control section for heating the foaming material 215 by the heating plates 241, 242, and the molding section for performing press molding. The foaming material 215 is set in the conveyance clamp 231, the driving force of the heating-plate conveyance servomotor 251 is transmitted by the heating-plate conveyance chain 254, and the clamp 231 is moved along the guide 258, whereby the foaming material 215 is moved between the two sections (a preheating section may be provided in front of the foaming control section).

The foaming control section comprises the pair of heating plates 241, 242, the heating-plate pressurizing hydraulic cylinder 268, the movable frame 267, the rods 261, 262, the shaft 265, the rapid open/close cam shafts 263, 264, the rapid open/close servomotor 266, the connecting plate 267a, the movable frame 267 and the displacement sensor 269. The foaming material 215 is heated by the heating plates 241, 242, and pressurizing force applied to the foaming material 215 is controlled, thereby performing controlled foaming.

The molding section comprises the male mold 274, the female mold 272, the molding hydraulic cylinder 271, the buckling suppresser 276 and the air cylinder 275 for suppressing buckling. The molding section performs press molding of the foaming material 215 while the material is in the process of free foaming.

The operation of this foam molding apparatus will now be described.

First, the foaming material 215 is set in the clamp 231. Then, in the foaming control section, the heating-plate pressurizing hydraulic cylinder 268 is driven to transmit power to the heating plate 242 via the movable frame 267, the rod 262, the shaft 265, the rapid open/close cam shafts 263, 264 and the rod 261. Thus, pressure is applied by the heating plate 242 while the foaming material 215 is being heated. Foaming is controlled by controlling the hydraulic pressure of the heating-plate pressurizing hydraulic cylinder 268. It should be noted that when the foaming material 215 is pressurized by the heating plates 242, 241 owing to drive of the heating-plate pressurizing hydraulic cylinder 268, the rapid open/close servomotor 266 is driven so that the rods 261, 262 and rapid open/close cam shafts 263, 264 become collinear.

When control of heating and foaming ends, the shaft 265 is rotated by driving the rapid open/close servomotor 266, as a result of which the rapid open/close cam shafts 263, 264 also rotate, whereby the heating plate 242 secured to the rod 261 is raised abruptly. In other words, the rapid open/close cam shafts 263, 264 are rotated rapidly to release the heating plate 242, and the foaming material 215 is conveyed to the molding section.

Next, the male mold 271 is lowered by driving the molding hydraulic cylinder 271 and the buckling suppresser 276 is lowered by driving the air cylinder 275 for buckling suppression, whereby press molding is carried out.

A foam molding method according to a third embodiment of the invention will be described.

The foam molding method illustrating a third embodiment of the present invention will now be described with reference to FIGS. 34(a) through 34(d).

First, as shown at (a) of FIG. 34, a foaming material 301 is set in a lower mold (female mold) 302 serving also as a chamber, the chamber is filled with a high-temperature, high-pressure gas 304 from above and below the foaming material 301, and foaming control is carried out while heating is applied. The pressure of the high-temperature, high-pressure gas 304 is set so as to control the amount of foaming of the foaming material 301, as illustrated in the first and second embodiments.

Next, as shown at (b) of FIG. 34, the high-pressure gas 304 is allowed to leak to remove the pressurizing force impressed upon the foaming material 301, and control of foaming is halted. Furthermore, heating also is removed by leakage of the high-temperature, high-pressure gas 304.

Next, as illustrated at (c) of FIG. 34, the foaming material 301 is allowed to undergo free foaming inside the lower mold (female mold) 302 serving also as the chamber.

Next, by driving the molding hydraulic cylinder (not shown), the upper mold (male mold) 303 is driven downward, as shown at (d) of FIG. 34, whereby the foaming material 301 undergoing free foaming is subjected to press molding. Vacuum molding may be performed conjointly by simultaneously evacuating the mold.

A foam molding method according to a fourth embodiment of the invention will be described.

The foam molding method illustrating the fourth embodiment of the present invention will now be described with reference to FIGS. 35(a) through 35(d).

First, as shown at (a) of FIG. 35, a foaming material 401 having a diaphragm membrane 402 on its surface is set in a mold 403 serving also as a chamber, and the mold 403 is provided with a cover 404. The chamber is filled with a high-temperature, high-pressure gas 405 from above and below the foaming material 401, and foaming control is carried out while heating is applied. The pressure of the high-temperature, high-pressure gas 405 is set so as to control the amount of foaming of the foaming material 401, as illustrated in the first and second embodiments.

Next, as shown at (b) of FIG. 35, the high-pressure gas 405 is allowed to leak to remove the pressurizing force impressed upon the foaming material 401, and control of foaming is halted. Furthermore, heating also is removed by leakage of the high-temperature, high-pressure gas 405.

Next, as illustrated at (c) of FIG. 35, the foaming material 401 is allowed to undergo free foaming inside the lower mold 403 serving also as the chamber.

Next, as shown at (d) of FIG. 35, the space below the foaming material 401 is rapidly brought to negative pressure during free foaming of the foaming material 401 to perform evacuation 407. The space above the foaming material 401 is filled with high-pressure gas 406 to urge the foaming material 401 against the lower mold 403 and achieve molding.

Since controlled foaming is carried out in the manner described above, foaming proceeds satisfactorily and a high-quality core is obtained.

Further, by performing controlled foaming and lowering the foaming force, free foaming in the ensuing process no longer becomes sudden foaming. The mechanical moving process is performed with ease and flawing of a foam body during free foaming can be prevented.

Furthermore, in the process for moving the heating device, it is so arranged that the foaming material and the heating device (heating plates or high-temperature fluid) are capable of being separated from each in order to conduct molding. As a result, constraint on the foaming of the foaming material is removed so that the material may start foaming freely. However, free foaming is not sudden and the foam body is maintained in excellent condition.

Further, in the pressurized molding process, a temperature at which molding is possible is established by heating. In addition, in a case where a foaming material having foaming pressure is molded (by press molding, vacuum molding, etc.), the molding of complicated shapes can be carried out with ease since the material possesses foaming pressure (internal pressure).

Furthermore, in the foregoing embodiment, the foaming material is molded during free foaming, the material is molded into the desired shape even if the article is a complicated one, and a molded article of high quality is obtained. However, the invention is not limited to this arrangement.

In actuality, molding the foaming material during free foaming is best. However, it is possible to mold a foaming material whose free foaming will end or a foaming material whose free foaming has ended. In any case, the foaming material must be heated to the molding temperature in the molding process.

Further, the present invention is not limited to the foregoing embodiments but can be modified in various ways on the basis of the gist of the invention, and that these modifications do not depart from the scope of the invention.

Thus, in accordance with the present invention as described above in detail, the following effects are obtained.

(1) A process is executed in which heating is performed while the amount of foaming of the foaming material is controlled. As a result, the rate of free foaming can be set to a value at which mechanical control is possible (movement of the heating device, etc.), and a high-quality molded article can be foam-molded.

(2) Since molding is conducted during foaming, internal pressure can be utilized and complicate foam molding can be implemented with ease.

(3) Since molding is conducted during foaming, the core suffers less damage in comparison with heating molding from a foam body whose foaming has already ended.

(4) In a case where the heating device and molding apparatus are moved, the heating device is held at high temperature, which is beneficial. As a result, time for elevating temperature can be shortened. In addition, since the molding apparatus does not attain a high temperature, cooling of the foaming material can be accomplished in a short period of time and molding at a high-speed cycle can be carried out.

What is claimed is:

1. A foam molding method for producing a three-dimensional molded article from a foamable material, comprising:

(a) heating said foamable material to cause foaming by contacting a surface of said foamable material with at least one planar heating element;

(b) pressing said heating element against said surface to apply pressure to said surface and to initiate a first period of time during which said foaming occurs and controllably varying the pressure of said heating element against said surface to thereby control the amount of said foaming during said first period of time;

(c) removing said heating element from contact with said surface, to end said first period of time, to remove the applied pressure from said surface and to initiate a second period of time during which said foamable material is allowed to undergo free foaming free of the applied pressure; and then (d) reshaping said foamable material into the three-dimensional molded article by pressing said foamable material with at least one three-dimensional mold element while said formable material is undergoing said free foaming.

2. The method according to claim 1 further comprising:
applying and control of the amount of foaming of said
controlling displacement of said one heating element, during said first period of time to thereby control the applied pressure.

3. The method according to claim 1 wherein said reshaping is by compressing said foamable material between male and female mold elements.

* * * * *

UNITED STATES PATENT AND TRADEMARK OFFICE
CERTIFICATE OF CORRECTION

PATENT NO.   : 5,849,227
DATED        : December 15, 1998
INVENTOR(S)  : CHIKUGO et al It is certified that error appears in the above-indentified patent and that said Letters Patent is hereby corrected as shown below:

Col. 8, line 61, delete "5", second instance.

Col. 9, line 13, delete "25".

Col. 16, line 2, delete entire line.

Signed and Sealed this

Twenty-first Day of December, 1999

Attest:

Q. TODD DICKINSON

Attesting Officer   Acting Commissioner of Patents and Trademarks